US010878723B2

United States Patent
Tang

(10) Patent No.: US 10,878,723 B2
(45) Date of Patent: Dec. 29, 2020

(54) NONLINEAR INSTABILITY SCIENTIFIC DEMONSTRATOR FOR VEHICLE DYNAMICS

(71) Applicant: Shaojie Tang, Sugar Land, TX (US)

(72) Inventor: Shaojie Tang, Sugar Land, TX (US)

(*) Notice: Subject to any disclaimer, the term of this patent is extended or adjusted under 35 U.S.C. 154(b) by 227 days.

(21) Appl. No.: 16/153,883

(22) Filed: Oct. 8, 2018

(65) Prior Publication Data

US 2020/0111387 A1 Apr. 9, 2020

(51) Int. Cl.
*G09B 23/10* (2006.01)
*F16M 11/12* (2006.01)

(52) U.S. Cl.
CPC .......... *G09B 23/10* (2013.01); *F16M 11/123* (2013.01)

(58) Field of Classification Search
CPC ....... G09B 23/08; G09B 23/10; F16M 11/123
See application file for complete search history.

(56) References Cited

U.S. PATENT DOCUMENTS

| 3,695,554 A * | 10/1972 | Phillips | B64G 1/38 244/170 |
| 10,621,883 B2 * | 4/2020 | Chesi | B64G 7/00 |
| 2011/0221900 A1 * | 9/2011 | Reich | F16M 13/02 348/144 |
| 2020/0111381 A1 * | 4/2020 | Tang | G06F 30/15 |

FOREIGN PATENT DOCUMENTS

FR 2691825 A1 * 12/1993 ............ G09B 23/10

OTHER PUBLICATIONS

Day, Coupling Dynamics in Aircraft: A Historical Perspective, 1997, NASA, pp. 56-57 (Year: 1997).*
SNAME, Nomenclature for treating the motion of a submerged body through a fluid, Technical and Research Bulletin No. 1-5, 1950.
Richard E. Day, Coupling Dynamics in Aircraft: A History Perspective, NASA special publication No. 532, 1997.
USAF Test Pilot School, Chapter 9 Roll Coupling, Flying Qualities Textbook V. II, Part 2. 1986.
Steve S. Tang, A new discovery: Nonlinear instability leading to loss of control of aircraft, AIAA Houston Section ATS, Jorson Space center, NASA, Jun. 1, 2019.

* cited by examiner

*Primary Examiner* — Michael McCullough

(57) ABSTRACT

A method for demonstrating a new scientific discovery made by the inventor about the nonlinear instability of vehicles, like aircrafts, automobiles and ocean vehicles. Said method includes a model and a three-gimbaled framework that permits said model to respond to inertial moments about the axes of which the moments of inertias are the smallest and the largest, wherein said model has restoring and damping capabilities along these two axes. Said method also comprises how to use a variable motor or a crank for controlling said model rotational motions about the intermediate principal axis of inertia with closed form formulas for the external driven frequencies and amplitudes to be used to excite the nonlinear instabilities of said model. Said model could be an aircraft, an automobile, a ship, or even a rectangular block.

4 Claims, 15 Drawing Sheets

NONLINEAR INSTABILITY SCIENTIFIC DEMONSTRATOR FOR VEHICLE DYNAMICS

FIELD OF THE INVENTION

The present invention is related to a demonstrator for education, demonstration and recreation purpose, more specifically an apparatus for such use as a demonstrator to show a nonlinear instability phenomenon which happens quite often to vehicles, such as aircrafts, automobiles, ocean vehicles, or the like. This phenomenon is related to the nonlinear instability discovered in the book, "Nonlinear Instability and Inertial Coupling Effects—The Root Causes Leading to Aircraft Crashes, Land vehicle Rollovers, and Ship Capsizes" (ISBN 978-1-7326323-0-1, to be published in November 2018) written also by the inventor. The present invention is particularly useful for training pilots to avoid uncommanded roll, pitch and yaw and to prevent Pilot-Induced-Oscillation (PIO); for training automobile operators to avoid rollovers; and for training captains to avoid violent ship motions including capsize.

BACKGROUND OF THE INVENTION

Vehicles like cars, ships, and aircrafts all have rolling problems. Cars have rollover; ships have rolling and capsizing; and aircrafts have Dutch roll and mysterious crashes. Is it just a coincident that all these three major types of vehicles have the same rolling problem? Or it is not. The fact is that all these vehicles follow a same scientific law and show the same symptom. These vehicles have existed for more than a century. It is believed that the rolling problems have, so far, accounted for accidents and deaths in the level of millions and the cost of injuries in medical care, disability and property damage in trillions of dollars worldwide. This invention is one of several inventions the inventor has invented to deal with those dangerous rolling phenomena in order to save lives on the roads, in the ocean, and in the sky around the world by applications of a new scientific discovery about the nonlinear instability of the vehicle dynamics.

From the viewpoint of physics, these vehicles are nothing but rigid body systems of six degrees of freedom (three translational motions in three perpendicular axes, i.e. forward/backward, left/right, up/down; and three rotational motions about three perpendicular axes, often termed roll, pitch, and yaw). Believe it or not, the three rotational (roll, pitch, and yaw) motions under external moments have never been solved analytically without linearization approximation and as a result they have never been understood satisfactorily due to the fact that the governing equations for these motions are nonlinear which was extremely difficult to deal with analytically. Although numerical simulations for these motions have been obtained, the results were often difficult to be explained because of the lack of the correct understanding of the mechanism. There have been so many cases of SUV rollovers, airplane crashes, and ship capsizing, which were hard to be explained and have remained mysterious.

There has been a fundamental mistake made in dealing with the vehicle dynamics. For a vehicle, no matter it is a car, a ship or an aircraft, the governing equations for its rotational motions (roll, pitch, and yaw) are given by Math.1 in the vector form. They were obtained based on Newton's second law of motions in a body-fixed reference frame, see references, SNAME: Nomenclature for treating the motion of a submerged body through a fluid, Technical and Research Bulletin No. 1-5 (1950).

$$d\vec{H}/dt = -\vec{\omega} \times \vec{H} + \vec{M}, \qquad \text{Math. 1}$$

wherein $\vec{\omega}=(p,q,r)=(\dot{\varphi},\dot{\theta},\dot{\psi})$: the angular velocities of the vehicle; $\varphi,\theta,\psi$: the roll, pitch, and yaw angle about the principal axes of inertias X, Y, Z, respectively; $\vec{H}=(I_x p, I_y q, I_z r)$: the angular momentum of the vehicle; $I_x, I_y, I_z$: the moment of inertias about the principal axes of inertias X, Y, Z, respectively (These parameters are constants in this frame); $\vec{M}=(M_x, M_y, M_z)$: the external moments acting on the vehicles about the principal axes of inertia. In both the academies and industries related to automobiles, aircrafts, and ships, the current practice to deal with Math. 1 is to make a linearization approximation first and then solve the equations because the nonlinear term $-\vec{\omega} \times \vec{H}$ is too difficult to deal with. The linearization approximation makes the nonlinear term $-\vec{\omega} \times \vec{H}$ disappear, the equations then become $$d\vec{H}/dt = \vec{M} \qquad \text{Math. 2}$$

However, the equations are still considered in the body-fixed reference frame which is a non-inertial frame. The reason for this is that the external moments $(M_x, M_y, M_z)$ acting on vehicles and the moments of inertia $I_x, I_y, I_z$ are needed to be considered in the body-fixed reference frame.

The fundamental mistake is that the nonlinear term $-\vec{\omega} \times \vec{H}$ cannot be neglected because they are the inertial moments tied to the non-inertial reference frame which is the body-fixed reference frame in this case. This mistake is similarly like we neglect the Coriolis force which equals $-2\vec{\Omega} \times \vec{V}$, where $\vec{\Omega}$ is the angular velocity vector of the earth and $\vec{V}$ is the velocity vector of a moving body on earth. Then we try to explain the swirling water draining phenomenon in a bathtub. In this case, we are considering the water moving in the body-fixed and non-inertial reference frame which is the earth. The Coriolis force is an inertial force generated by the rotating earth on the moving objects which are the water particles in this case. Without the Coriolis force, we cannot explain the motions of the swirling water. Similarly in the vehicle dynamics, the vehicle is rotating, and we consider the rotational motions of the vehicle in the body-fixed and non-inertial reference frame which is the vehicle itself. The difference between the two cases is that in the former the object (water particle) has translational motions ($\vec{V}$) while in the latter the object (vehicle itself) has rotational motions ($\vec{\omega}$) but they both have the important inertial effects which cannot be neglected because both the objects are considered in the non-inertial reference frames. In the former the inertial effect is the Coriolis force $-2\vec{\Omega} \times \vec{V}$ while in the latter the inertial effect is the inertial moment $-\vec{\omega} \times \vec{H}$ which are not forces but moments since we are dealing with rational motions instead of translational one. Without the inertial moment, we cannot explain many phenomena which happened to aircrafts, automobiles, and ships, such as uncommanded motions of roll, pitch, and yaw for aircrafts; Pilot-Induced-Oscillation (PIO) for aircrafts; automobile rollovers; and ship capsizes.

In the inventor's book, the equations Math.1 have been solved analytically without the linearization approximation and it was found that the pitch motion, without loss of generality assuming the pitch moment of inertia to be the intermediate between the roll and yaw inertias, is conditionally stable and becomes unstable in certain circumstances. A brief summary of the findings is given below. The governing equations of rotational motions of an aircraft or an automobile under a periodic external pitch moment can be written in scalar form as $$I_x\ddot{\varphi}+b_1\dot{\varphi}+k_1\varphi=(I_y-I_z)\dot{\theta}\dot{\psi}, \qquad \text{Math. 3}$$

$$I_y\ddot{\theta}+b_2\dot{\theta}+k_2\theta=(I_z-I_x)\dot{\varphi}\dot{\psi}+M_{21}\cos(\omega_{21}t+\alpha_{21}), \qquad \text{Math. 4}$$

$$I_z\ddot{\psi}+b_3\dot{\psi}+k_3\psi=(I_x-I_y)\dot{\varphi}\dot{\theta}, \qquad \text{Math. 5}$$

wherein $b_1, b_2, b_3$ are the damping coefficients for roll, pitch, and yaw, respectively; $k_1, k_2, k_3$ are the restoring coefficients for roll, pitch, and yaw, respectively; $M_{21}$ is the external pitch moment amplitude; $\omega_{21}$ and $\alpha_{21}$ are the frequency and phase of the external pitch moment, respectively. These equations represent a dynamic system governing the rotational dynamics of vehicles, such as an aircraft when taking off or approaching to landing or an automobile when running off the curb where the most fatal rollovers happen. According to the current practice in the industries under the linearization approximation, these equations become $$I_x\ddot{\varphi}+b_1\dot{\varphi}+k_1\varphi=0, \qquad \text{Math. 6}$$

$$I_y\ddot{\theta}+b_2\dot{\theta}+k_2\theta=M_{21}\cos(\omega_{21}t+\alpha_{21}), \qquad \text{Math. 7}$$

$$I_z\ddot{\psi}+b_3\dot{\psi}+k_3\psi=0. \qquad \text{Math. 8}$$

Therefore the current practice says that the vehicle will only have pitch motion, no roll and yaw motions because there are no moments acting on roll and yaw directions. In reality, however, there exist moments acting in roll and yaw directions as indicated by the nonlinear terms in the right hand sides of Math. 3 and Math. 5, respectively. These moments are the components of the inertial moment vector $-\vec{\omega}\times\vec{H}$ along roll and yaw directions, respectively, and they are real and must not be neglected. The linearization theory assumes that these nonlinear terms are small so that they can be neglected. The fact is that this assumption is not always valid. The reason is explained below. The roll and yaw dynamic systems of vehicles are harmonic oscillation systems as shown in Math. 3 and Math. 5. As we know for a harmonic system, a resonance phenomenon can be excited by a driving mechanism no matter how small it is as long as its frequency matches the natural frequency of the system. It was found in the inventor's book mentioned above that under certain circumstances the nonlinear terms, $(I_y-I_z)\dot{\theta}\dot{\psi}$ and $(I_x-I_y)\dot{\varphi}\dot{\theta}$ can simultaneously excite roll and yaw resonances, respectively. In these cases, the pitch motion becomes unstable and the roll and yaw motions grow exponentially at the same time under the following two conditions, Math. 9 and Math. 10. Such nonlinear instability is a phenomenon of double resonances, i.e. roll resonance in addition to yaw resonance.

$$A_P > A_{P-TH} = \frac{1}{\omega_{21}}\sqrt{\frac{b_1 b_3}{(I_z-I_y)(I_y-I_x)}} \text{ and} \qquad \text{Math. 9}$$

$$\omega_{21} = \omega_{10} + \omega_{30},$$

$$A_P > A_{P-TH} = \frac{1}{\omega_{21}}\sqrt{\frac{b_1 b_3}{(I_z-I_y)(I_y-I_x)}} \text{ and} \qquad \text{Math. 10}$$

$$\omega_{21} = |\omega_{10} - \omega_{30}|,$$

wherein $A_P$ is the pitch response amplitude under the external pitch moment $M_{21}\cos(\omega_{21}t+\alpha_{21})$; $\omega_{10}=\sqrt{k_1/I_x}$ and $\omega_{30}=\sqrt{k_3/I_z}$ are the roll and yaw natural frequencies, respectively. The nonlinear dynamics says that the pitch motion is stable until the pitch motion reaches the threshold values $A_{P-TH}$ given in Math. 9 or Math.10. These threshold values show that the vehicle has two dangerous exciting frequencies in pitch. These two frequencies are either the addition of the roll natural frequency $\omega_{10}$ and the yaw natural frequency $\omega_{30}$ or the subtraction of them. At each frequency, the pitch amplitude threshold for pitch to become unstable is inversely proportional to the pitch exciting frequency, proportional to the square root of the product of the roll and yaw damping coefficients, and inversely proportional to the square root of the product of the difference between the yaw and pitch moments of inertia and the difference between the pitch and roll moments of inertia. In summary, there are three factors having effects on the pitch threshold and they are a) the roll and yaw damping, b) the pitch exciting frequency, and c) the distribution of moments of inertia. The most dominant one among these three factors is the damping effect since the damping coefficients could go to zero in certain circumstances, for example, aircraft yaw damper malfunction which makes the yaw damping become zero, or aircraft in stall condition which makes the roll damping become zero. When either the roll damping or the yaw damping is approaching to zero, the pitch threshold is approaching to zero as well and the pitch motion, even it is small but as long as larger than the threshold value, will become unstable and transfer energy to excite roll and yaw resonances. That is the root mechanism behind all these mysterious tragedies mentioned above. In the inventor's book detailed scientific proofs based on analytical, numerical and experimental results have been given. Many real case analyses, like aircraft crashes and SUV rollovers, have been given as well.

The nonlinear instability is always tied with the rotational direction where the moment of inertia is the intermediate between the other two inertias. Depending on the mass distribution of a vehicle, it could have roll, pitch, or yaw nonlinear instability if the roll, pitch, or yaw moment of inertia is the intermediate one, respectively.

There existed one device as shown in FIG. 1, fabricated in 1955 by the NACA machine shop, used as a demonstrator to show the so-called inertial roll coupling, see Richard E. Day, Coupling Dynamics in Aircraft: A History Perspective, NASA special publication 532 (1997). It was used to show the effect of the inertial roll coupling due to steady rolling motion (constant roll speed) of which the moment of inertia is the smallest, not the intermediate. The principal roll axis of the model has to be different with the rotation axis (the aerodynamic axes) of rolling otherwise there is no inertial coupling phenomenon, see also USAF Test pilot school, Chapter 9 Roll coupling, V. II Flying qualities phase (1986). As shown in FIG. 1, the model has to be asymmetric top and bottom and the bars with adjustable weights can be rotated in pitch to vary the product of inertia, $I_{xy}$, and thus change the angle of the principal roll axis relative to the roll rotation axis. The nonlinear instability phenomenon discovered by the inventor happens in unsteady (non-constant) rotational motion about the principal axis of the intermediate moment of inertia (not the smallest) of aircrafts. Therefore, this device cannot be used to demonstrate the nonlinear instability phenomenon of aircrafts.

The above described nonlinear instability of vehicle dynamics, including aircraft dynamics, automobile dynamics, ocean vehicles dynamics, or the like, is a new scientific discovery made by the inventor. Therefore there is a need for an apparatus which can perform experiments to show the dangerous nonlinear instability in order to understand and prevent such double resonances and to save lives.

SUMMARY OF THE INVENTION

The principal objective of the present invention is to provide an apparatus to prove the new scientific discovery by disclosing why, when and how the nonlinear instability happens and to provide an educational tool, as a demonstrator, to show the nonlinear instability to educate pilots, automobile operators, captains, etc. to prevent such dangerous phenomena.

In one embodiment, a method and an apparatus are presented for aircrafts. As an example, this apparatus provides a means for an aircraft model supported by a three-gimbal framework with restoring and damping capabilities in roll and yaw directions to demonstrate the nonlinear pitch instability of aircrafts, assuming the pitch moment of inertia of the aircraft model to be the intermediate between the roll and yaw inertias. The model is symmetric about its XOY and XOZ planes and able to rotate ±360° in roll and pitch, and almost ±90° in yaw, see FIG. 2 and FIG. 3. This apparatus permits only external pitch moments to be exerted on the model therefore any roll and yaw motions of the model are due to the nonlinear inertial moments which have been neglected so far in analyses in the academies and industries related to aircrafts. The natural roll and yaw frequencies and the roll and yaw damping coefficients of the model may be adjusted to match any full scale aircraft's data so that the nonlinear dynamics of the full scale aircraft is able to be simulated. By adjusting the roll and yaw damping and applying an externally exciting pitch moment at certain frequency and amplitude, the nonlinear pitch instability phenomenon can be triggered so that the roll and yaw resonances may be excited without any help of external roll and yaw moments. The frequencies and amplitudes of the externally exciting pitch moments may be based on the theory in the inventor's book as briefly described above. The externally exciting pitch moments may be applied manually by hand acting on either the crank or directly on the inner frame at desired frequencies and amplitudes. In such a way, uncommanded roll and yaw motions, and pilot-induced-oscillations may be demonstrated.

In another embodiment, a method and an apparatus are presented for automobiles. As an example, this apparatus provides a means for an automobile model supported by a three-gimbal framework with restoring and damping capabilities in roll and yaw directions to demonstrate the nonlinear pitch instability of automobiles, assuming the pitch moment of inertia of the automobile to be the intermediate between the roll and yaw inertias. The model is symmetric about its XOY, XOZ, and YOZ planes and able to rotate ±360° in roll and pitch, and almost ±90° in yaw see FIG. 16. This apparatus permits only external pitch moments to be exerted on the model therefore any roll and yaw motions of the model are due to the nonlinear inertial moments which have been neglected so far in analyses in the academies and industries related to automobiles. The natural roll and yaw frequencies and the roll and yaw damping coefficients of the model may be adjusted to match any full scale automobile's data so that the nonlinear dynamics of the full scale automobile is able to be simulated. By adjusting the roll and yaw damping and applying an externally exciting pitch moment at certain frequency and amplitude, the nonlinear pitch instability phenomenon can be triggered so that the roll and yaw resonances are excited without any help of external roll and yaw moments. The frequencies and amplitudes of the externally exciting pitch moments may be based on the theory in the inventor's book as briefly described above. The externally exciting pitch moments may be applied manually by hand acting either on the crank or directly on the inner frame at desired frequencies and amplitudes.

In yet another embodiment, a method and an apparatus are presented for automobiles. As an example, this apparatus provides a means for an automobile model supported by a three-gimbal framework with restoring and damping capabilities in roll and pitch directions to demonstrate the nonlinear yaw instability of automobiles, assuming the yaw moment of inertia of the automobile to be the intermediate between the roll and pitch inertias (this is to simulate certain truck loading conditions such that the yaw moment of inertia of the truck becomes the intermediate one). The model is symmetric about its XOY, XOZ, and YOZ planes and able to rotate ±360° in roll and yaw, and almost ±90° in pitch see FIG. 17. This apparatus permits only external yaw moments to be exerted on the model therefore any roll and pitch motions of the model are due to the nonlinear inertial moments which have been neglected so far in analyses in the academies and industries related to automobiles. The natural roll and pitch frequencies and the roll and pitch damping coefficients of the model may be adjusted to match any full scale automobile's data so that the nonlinear dynamics of the full scale automobile is able to be simulated. By adjusting the roll and pitch damping and applying an externally exciting yaw moment at certain frequency and amplitude, the nonlinear yaw instability phenomenon can be triggered so that the roll and pitch resonances are excited without any help of external roll and pitch moments. The frequencies and amplitudes of the externally exciting yaw moments may be based on the theory in the inventor's book as briefly described above. The externally exciting yaw moments may be applied manually by hand acting either on the crank or directly on the inner frame at desired frequencies and amplitudes.

In still yet another embodiment, a method and an apparatus are presented for ocean vehicles. This apparatus provides a means for a ship model supported by a three-gimbal framework with restoring and damping capabilities in roll and pitch directions to demonstrate the nonlinear yaw instability of ocean vehicles, assuming the loading condition leading to the yaw moment of inertia to be the intermediate between the roll and pitch moment of inertias. The model is symmetric about its XOY and XOZ planes and able to rotate ±360° in roll and yaw, and almost ±90° in pitch, see FIG. 18. This apparatus permits only external yaw moments to be exerted on the model therefore any roll and pitch motions of the model are due to the nonlinear inertial moments which have been neglected so far in analyses in the academies and industries related to ocean vehicles. The natural roll and pitch frequencies and the roll and pitch damping coefficients of the model may be adjusted to match any full scale ocean vehicle's data so that the nonlinear dynamics of the full scale ocean vehicle is able to be simulated. The natural frequencies and damping coefficients of roll and pitch have taken into account of the added mass effects for ocean vehicles therefore the model does not need to be in water. By adjusting the roll and pitch damping and applying an externally exciting yaw moment at certain frequency and amplitude, the nonlinear yaw instability phenomenon can be triggered so that the roll and pitch resonances may be excited without any help of external roll and pitch moments. The frequencies and amplitudes of the externally exciting yaw moments may be based on the theory in the inventor's book as briefly described above. The external yaw moments may be applied manually by hand acting either on the crank or directly on the inner frame at desired frequencies and amplitudes. In such a way, ship capsizing phenomenon in following and quartering seas may be demonstrated.

In further yet another embodiment, a method and an apparatus are presented for aircrafts. As an example, this apparatus provides a means for an aircraft model supported by a three-gimbal framework with restoring and damping capabilities in pitch and yaw directions to demonstrate the nonlinear roll instability of aircrafts, assuming the roll moment of inertia of the aircraft to be the intermediate between the pitch and yaw inertias. This model is to simulate certain aircrafts which have the roll moment of inertia to be the intermediate one between the other two, such as B-52 bomber. The model is symmetric about its XOY and XOZ planes and able to rotate ±360° in roll and pitch, and almost ±90° in yaw, see FIG. 21 and FIG. 22. This apparatus permits only external roll moments to be exerted on the model therefore any pitch and yaw motions of the model are due to the nonlinear inertial moments which have been neglected so far in analyses in the academies and industries related to aircrafts. The natural pitch and yaw frequencies and the pitch and yaw damping coefficients of the model may be adjusted to match any full scale aircraft's data so that the nonlinear dynamics of the full scale aircraft is able to be simulated. By adjusting the pitch and yaw damping and applying an externally exciting roll moment at certain frequency and amplitude, the nonlinear roll instability phenomenon can be triggered so that the pitch and yaw resonances may be excited without any help of external pitch and yaw moments. The frequencies and amplitudes of the externally exciting roll moments may be based on the theory in the inventor's book as briefly described above. The externally exciting roll moments may be applied manually by hand acting on either the crank or directly on the inner frame at the desired frequencies and amplitudes. In such a way, uncommanded pitch and yaw motions, and pilot-induced-oscillations may be demonstrated.

In still further yet another embodiment, a method and an apparatus are presented for a general case of a rigid body having roll and yaw restoring and damping capabilities. As an example, this apparatus provides a means for a rigid rectangular block model supported by a three-gimbal framework with restoring and damping capabilities in roll and yaw directions to demonstrate the nonlinear pitch instability of such rigid body system. The pitch moment of inertia of the block is by design to be the intermediate between the roll and yaw inertias. The model is symmetric about its XOY, XOZ, and YOZ planes and able to rotate ±360° in roll, pitch, and yaw, see FIG. 23. This apparatus permits only external pitch moments to be exerted on the model therefore any roll and yaw motions of the model are due to the nonlinear inertial moments. By adjusting the roll and yaw damping and applying an externally exciting pitch moment at certain frequency and amplitude, the nonlinear pitch instability phenomenon can be triggered so that the roll and yaw resonances may be excited without any help of external roll and yaw moments. The frequencies and amplitudes of the externally exciting pitch moments may be based on the theory in the inventor's book as briefly described above. The externally exciting pitch moments may be applied manually by hand acting either on the crank or directly on the outer frame at desired frequencies and amplitudes.

In further yet another embodiment, for all the above apparatuses for aircrafts, automobiles and ocean vehicles, the cranks are replaced by drive-control assemblies to controllably drive the nonlinear unstable motions in a precision fashion, which includes desired frequencies and amplitudes. The drive-control assembly comprises a variable speed motor, a slider, a slotted link mechanism, a gear rack and a gear. A method for adjusting the assembly for the precision control is presented.

BRIEF DESCRIPTION OF THE DRAWINGS

The following descriptions of drawings of the preferred embodiments are merely exemplary in nature and are not intended to limit the scope of the invention, its application, or uses in any way.

FIG. 4 is a side view of the aircraft model in FIG. 3a.

FIG. 5 is a back view of the aircraft model in FIG. 3a.

FIG. 6 is a top view of the aircraft model in FIG. 3a.

FIG. 7 is a zooming-in perspective view of the restoring and damping assemblies of the aircraft model in FIG. 3a.

FIG. 8 is a zooming-in side view of the aircraft model in FIG. 4 without parts 109a, 109c, 110a, 110c, and 111a.

FIG. 12a is an assembly view of the wing and the balance load in FIG. 3a.

FIG. 12b is a zooming-in view of the Dovetail groove sliding connector in FIG. 12a.

FIG. 16b is the zooming-in view of the bus model without the supporting frames and without the top adjustable weight 270a shown in FIG. 16a.

DETAILED DESCRIPTION OF PREFERRED EMBODIMENTS

Figure 1:
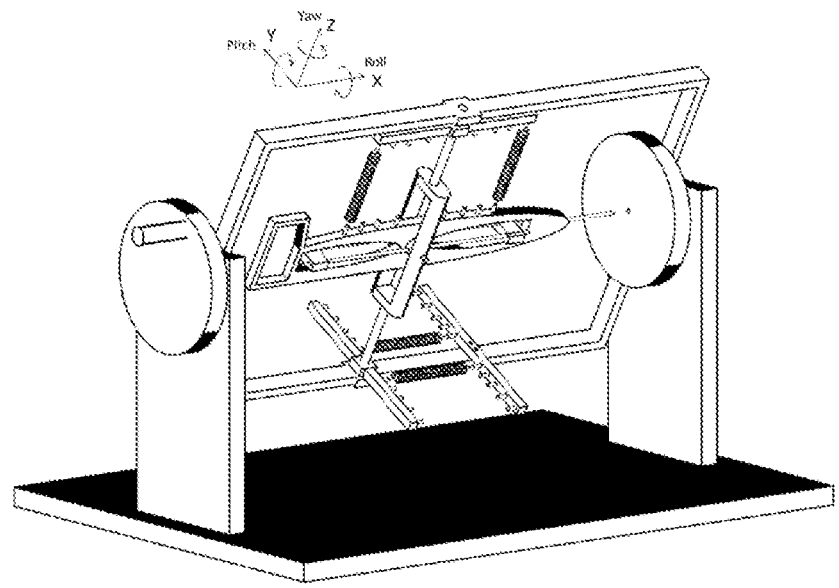
FIG. 1 is a perspective view of a prior related art of a demonstrator for showing the roll inertial coupling.
Figure 2:
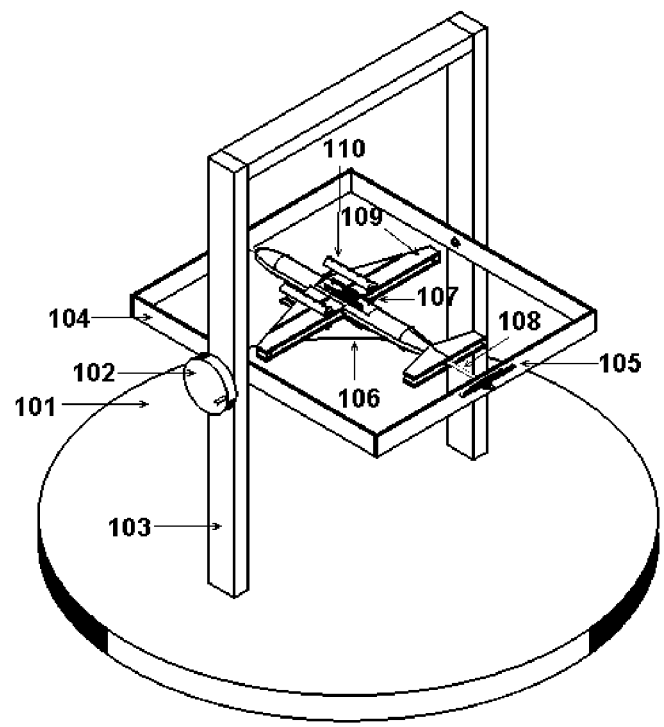
FIG. 2 is a perspective view of the apparatus as a demonstrator related to aircrafts in accordance with the first preferred embodiment.
Figure 3A:
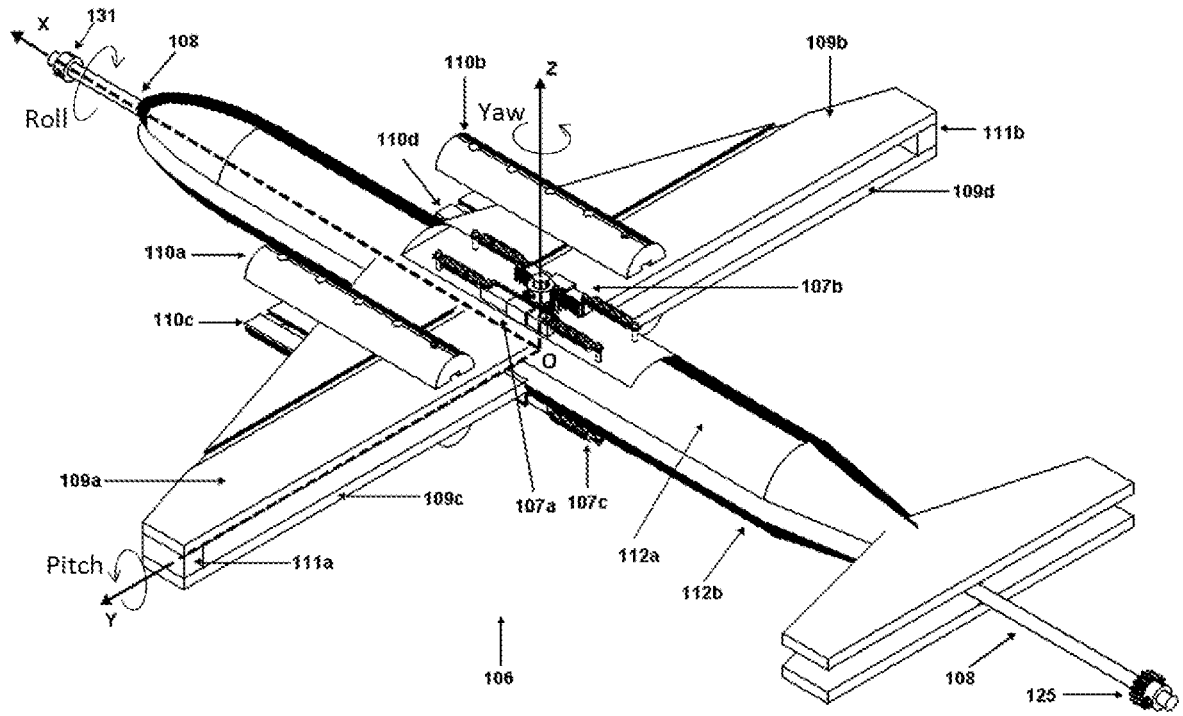
FIG. 3a is perspective view of the aircraft model and the roll and yaw axles without the supporting frames. This aircraft model has the pitch moment of inertia as the intermediate between the roll and yaw inertias.
Figure 10:
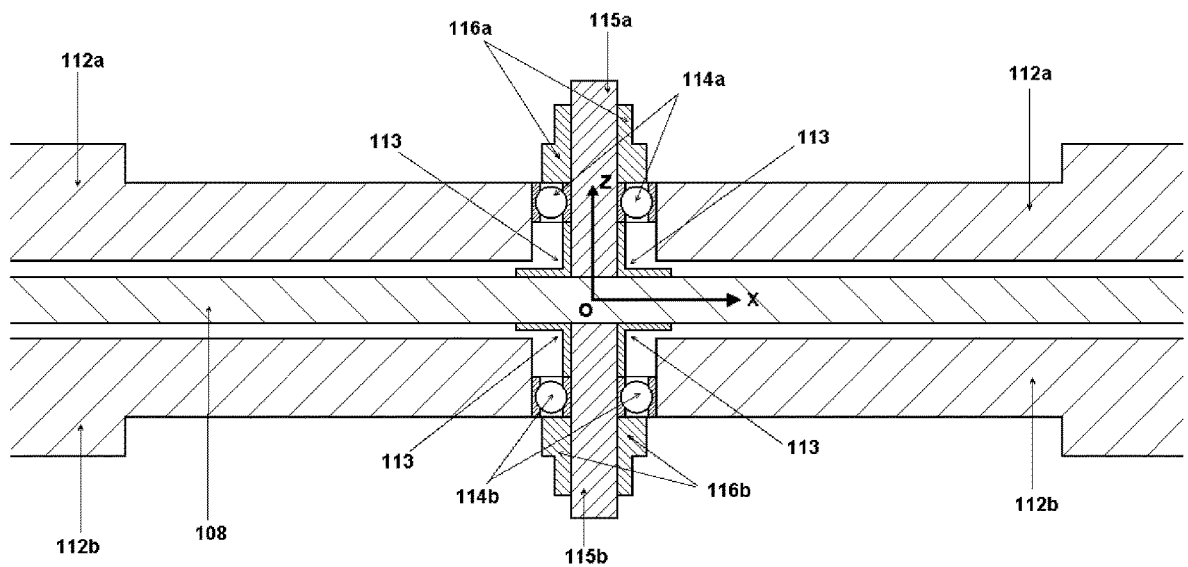
FIG. 10 is a sectional view of the cutting plane "A-A" in FIG. 6.
Figure 11:
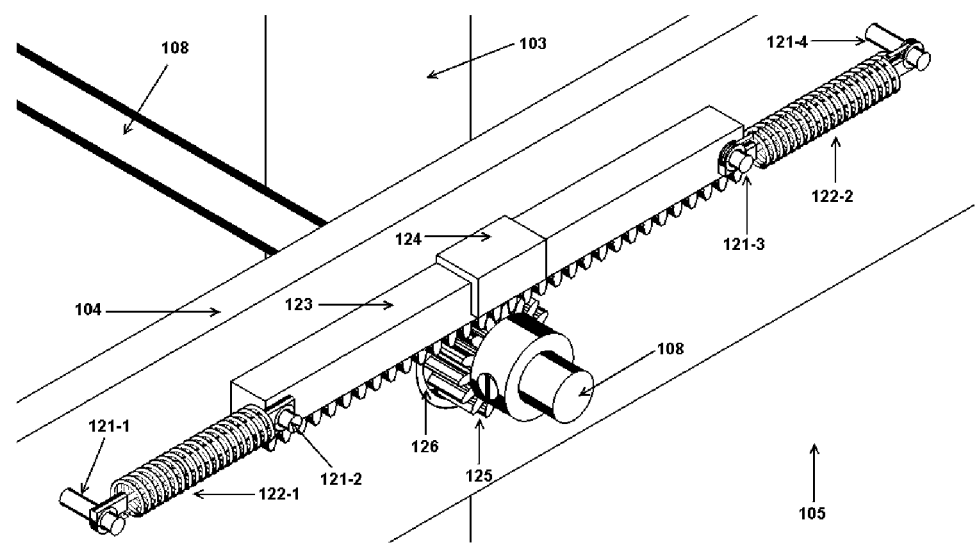
FIG. 11 is a perspective view of the roll restoring and damping assembly 105 of the aircraft model in FIG. 2.

Referring to the drawings, more particularly to FIG. 2, preferred the apparatus comprises a flat round base 101, an upside-down U type supporting frame 103 (the outer frame) rigidly mounted on the base 101, a crank 102 rigidly connected to another rectangular frame 104 (the inner frame) runs through a bearing (not shown in the figure) which is mounted in the outer frame 103 so that the crank can smoothly rotate the inner frame 104, an aircraft model 106 comprising two symmetric (top and bottom) parts about XOY plane is also symmetric (left and right) about XOZ plane as shown in FIG. 3a so that the principal inertial axes of the model are along the roll, pitch, and yaw axes of the model. The top and bottom parts are kept at certain distance and connected with each other at the two points located at the tips of wings 109a, 109b, 109c, and 109d, and the yaw axles in order to create one rigid piece of aircraft model. The significance of the model being two parts connected only at the two points and the yaw axles is that the empty space between the two parts provides space for a long roll axle and for the model to yaw up to almost ±90°. The center of gravity (COG) of the model is located at Point O as shown in FIG. 3a and FIG. 10. The COG coincides with the intersection point of roll, pitch, and yaw axes. Therefore, the roll, pitch, and yaw axes coincide with the X, Y and Z axes of the coordinate system as shown in FIG. 3a. A long roll axle 108 supporting the model 106 is in turn supported by two bearings (not shown) at the two ends of 108 and the two bearings are mounted in the two opposite sides of the frame 104. Yaw restoring and damping assemblies 107a and 107b are mounted on the top part of the model, and yaw restoring and damping 107c and 107d (not shown) on the bottom part of the model as shown in FIG. 3a. A roll restoring and damping assembly 105 in FIG. 2 and FIG. 11 is mounted on one side of the frame 104. In this embodiment, the pitch moment of inertia is the intermediate between the roll and yaw inertias, which represents the case of the most commercial aircrafts, for example, Boeing 737.

Figure 3B:
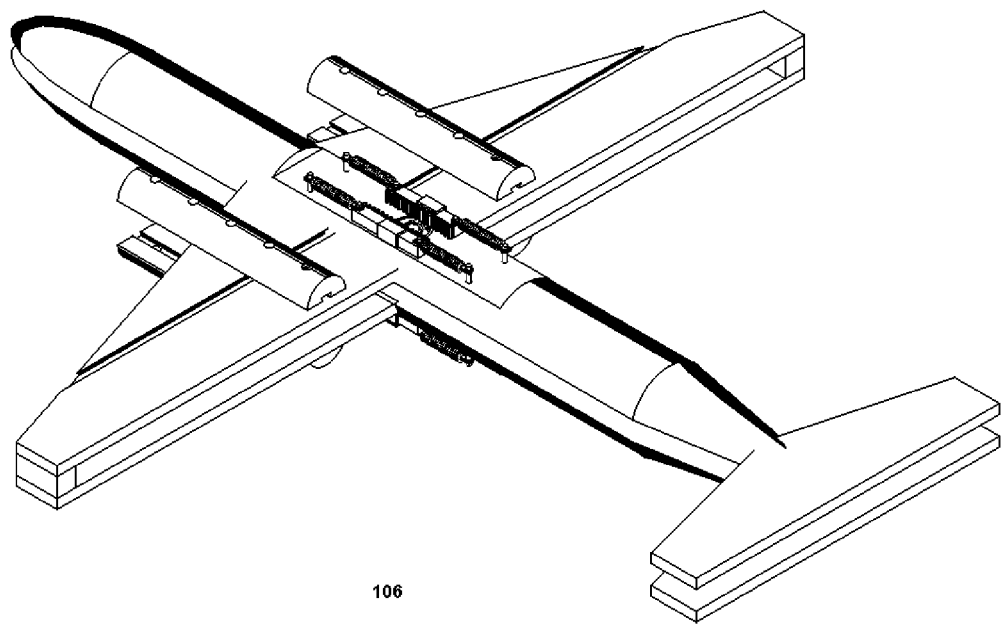
FIG. 3b is a perspective view of the aircraft model assembly.
Figure 3C:
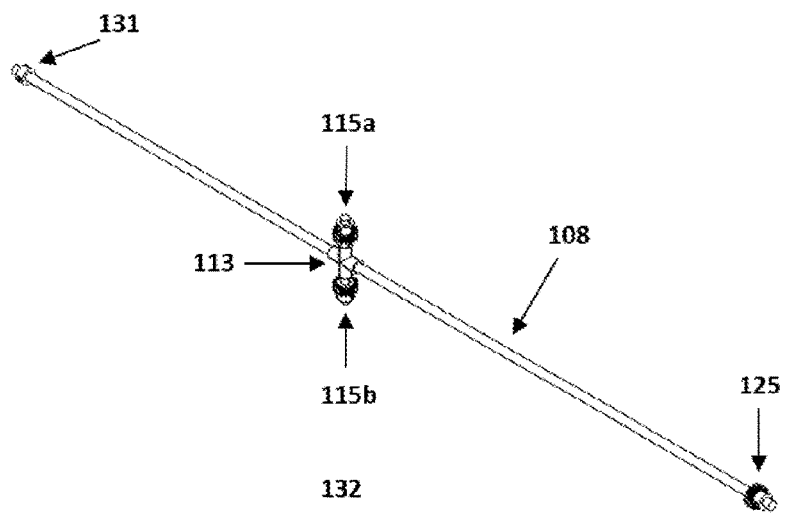
FIG. 3c is the perspective views of the roll and yaw axle assembly.
Figure 5:
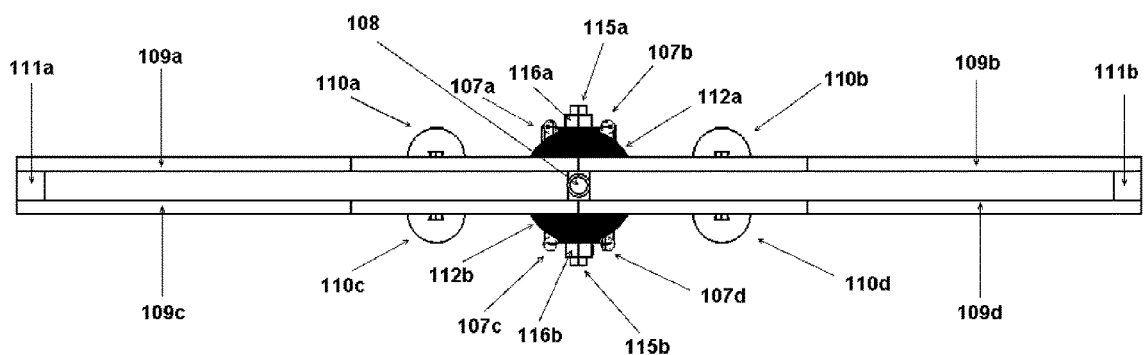

As shown in FIG. 3a, the aircraft model 106 has a top fuselage 112a and a bottom fuselage 112b, wings 109a and 109b are rigidly connected to top fuselage and wings 109c and 109d to the bottom fuselage, spacer 111a connecting the top wing 109a and the bottom wing 109c, spacer 111b connecting the top wing 109b and the bottom wing 109d, the spacers are to keep the top and bottom fuselage with wings apart at enough distance to allow the model 106 to freely rotate up to almost ±90° about the yaw axis (Z axis), adjustable weights 110a, 110b, 110c, and 110d sliding along two grooves which are perpendicular to each other and located on the wings and the weights, respectively, these weights could be positioned almost anywhere on the wings to vary the moment of inertias and to tune the COG of the model to coincide with the origin of the roll, pitch, and yaw axes, the weights 110a, 110b, 110c, and 110d are identical, the roll axle 108 is along the center line of the model and connected to the yaw axles 115a and 115b at the COG by a cross connector 113 as shown in FIG. 3c. As shown in FIG. 5 two yaw restoring and damping assemblies 107a and 107b are mounted on the top fuselage while two other yaw restoring and damping assemblies 107c and 107d are mounted on the bottom fuselage, the four spring and damping assemblies 107a, 107b, 107c, and 107d are identical. As shown in FIG. 3a, an axle collar 131 and a gear 125 located on each very ends of the roll axle 108 keep the axle fixed along the X direction when the model is moving. The standalone aircraft model 106 is shown in FIG. 3b. The roll and yaw axle assembly 132 is shown in FIG. 3c.

Figure 6:
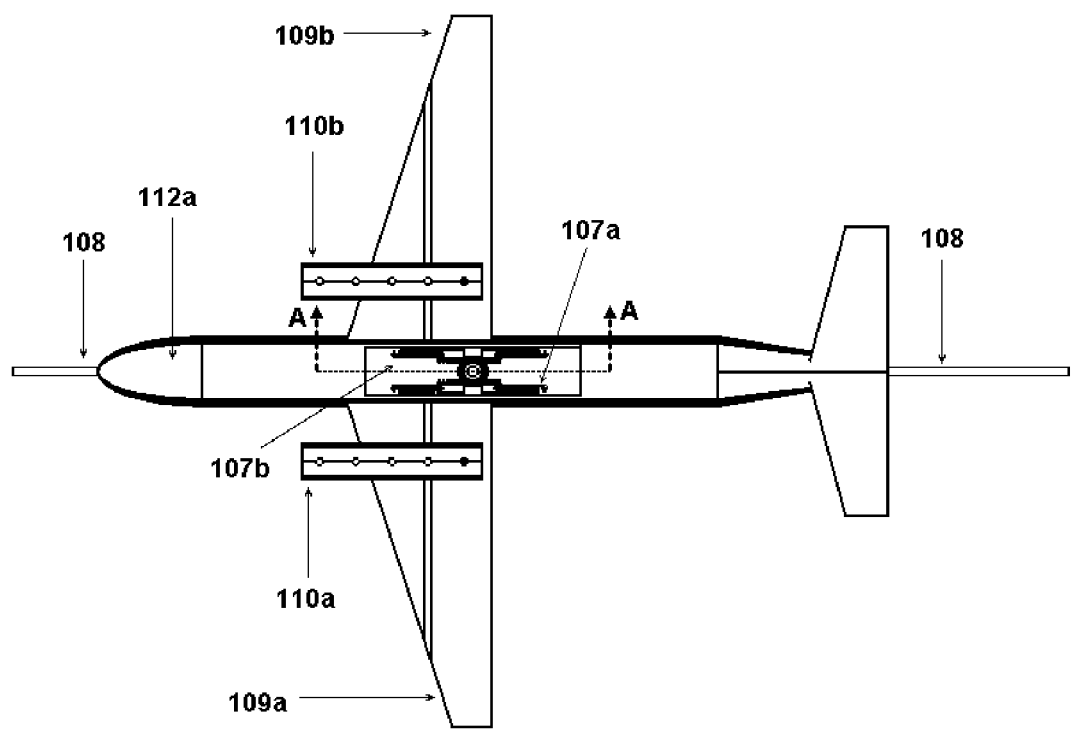
Figure 7:
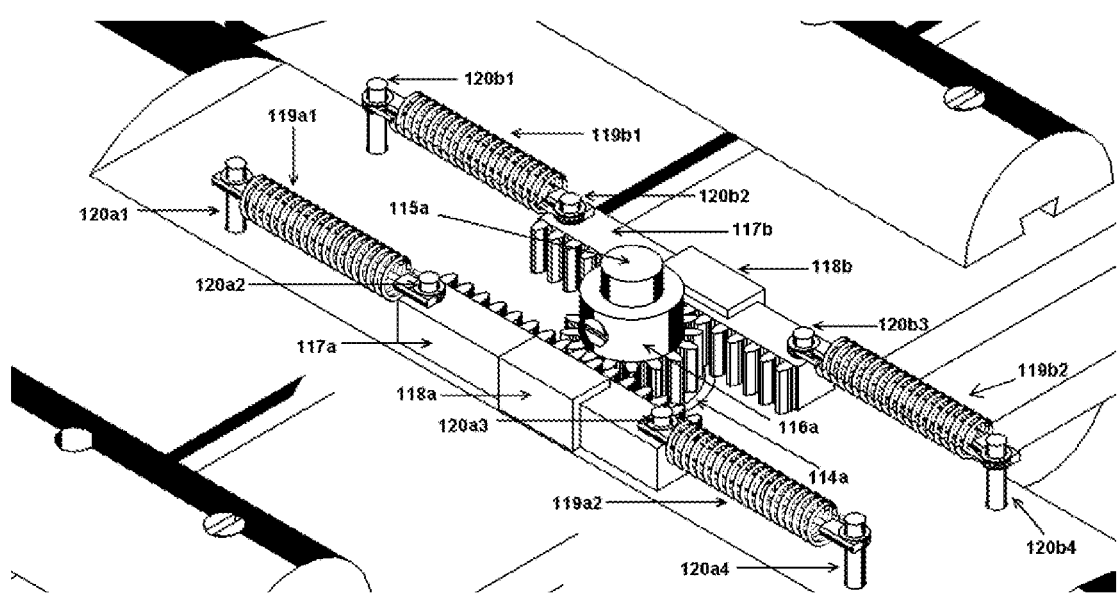
Figure 8:
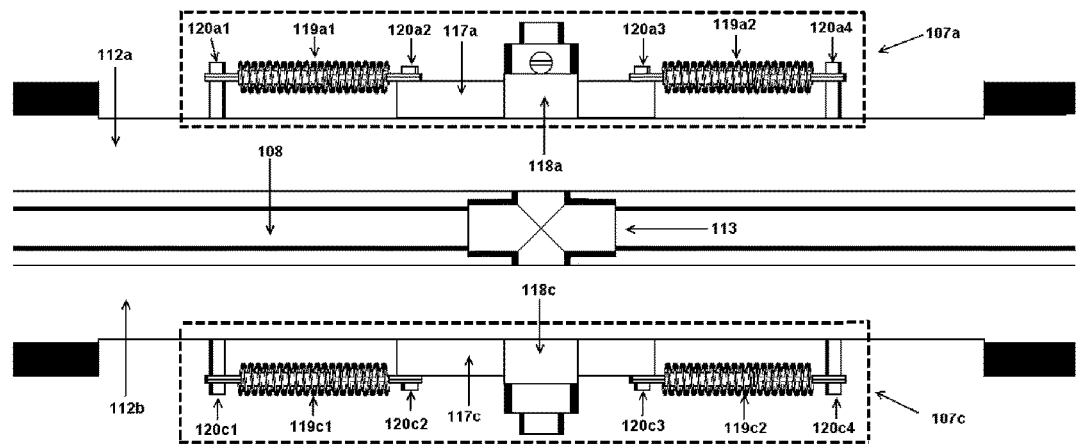

A zooming-in perspective view of the restoring and damping assemblies 107a and 107b on the top fuselage 112a is given in FIG. 7. A side view of the spring and damping assemblies 107a and 107c is given in FIG. 8. The assembly 107a comprises spring and damper combinations 119a1 and 119a2, a gear rack 117a, a right angle bracket 118a mounted on the top fuselage to serve as a guide for the linear motion of the gear rack 117a, spring posts 120a1 and 120a4 are mounted on the top fuselage while spring posts 120a2 and 120a3 are mounted on the two ends of the gear rack 117a. As shown in FIG. 5, the assembly 107a is located on one side of a gear 116a and the yaw axle 115a while assembly 107b is symmetrically located on the other side of the gear 116a and the yaw axle 115a. As shown in FIG. 7, similarly, the assembly 107b (also shown in FIG. 5) comprises spring and damper combinations 119b1 and 119b2, a gear rack 117b, a right angle bracket 118b mounted on the top fuselage to serve as a guide for the linear motion of the gear rack 117b. Spring posts 120b1 and 120b4 are mounted on the top fuselage while spring posts 120b2 and 120b3 are mounted on the two ends of gear rack 117b. Similar arrangements of the restoring and damping assemblies 107c (as shown in FIG. 8) and 107d (as shown in FIG. 5) are located on the bottom fuselage 112b as shown in FIG. 5. The gear 116a is mounted on the yaw axle 115a which goes through a ball bearing 114a as shown in FIG. 7 and FIG. 10. The FIG. 10 shows a section view along a plane which is cut at "A-A" of FIG. 6. As shown in FIG. 10, the ball bearing 114a sitting in a hole on the fuselage 112a is suspended on the cross connector 113, the gear 116a is fixed on the yaw axle 115a by a screw, the yaw axle 115a is fitted through the ball bearing 114a so that the aircraft model has the freedom to rotate about the yaw axle 115a. The yaw axle 115a, the gear 116a and the roll axle 108, however, do not have the degree of freedom in yaw. The aircraft model suspended on the roll axle 108 by the cross connector 113 as shown in FIG. 8 and FIG. 10 has three rotational degrees of freedom (roll, pitch, and yaw). The roll axle 108 supported at the ends by two bearings, one of which is ball bearing 126 as shown in FIG. 11. The two ball bearings are sitting in holes on the two opposite sides of frame 104 and only one side is shown in FIG. 11. The model together with the frame 104 and the roll axle 108 has the freedom to rotate about the pitch axis and all three of them may be driven by the crank as shown in FIG. 2. Therefore the aircraft model has unlimited freedom in roll and pitch, but only has a freedom to yaw up to almost ±90° since the model can only yaw up to the points where the spacers 111a and 111b in FIG. 3a touch the roll axle 108. Since the apparatus is designed to demonstrate the onset of the nonlinear instability which happens when the model is only pitching with certain frequencies and amplitudes, and then roll and yaw would grow from zero to large degrees without any help of external roll and yaw moments, the near ±90° freedom of yaw of the model is large enough for this purpose. Because any three-gimbal framework, including the current invention, has the so-called gimbal-lock problem that is when one of the rotational axes rotates and coincides with another axis then one rotational freedom is lost, the yaw motion at about ±90° of the model is not accurate anyway to simulate the free rotations of aircrafts. However, the nonlinear instability onset is accurately simulated because the model does not have gimbal-lock problem when roll and yaw are zero. To simulate a real aircraft dynamics in infinite freedoms in roll, pitch, and yaw, the inventor also invented a gimbal-lock-free flight simulator of which a patent will be applied separately.

Figure 9A:
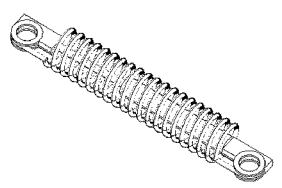
FIG. 9a is a perspective view of the spring and damper assembly as one unit and FIG. 9b is a perspective view of the spring and the damper to be used separately.
Figure 9B:
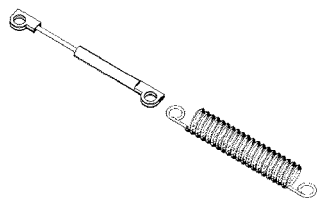

When the model yaws, the yaw axles 115a and 115b (shown in FIG. 10) are not yawing. The gear racks 117a, 117b (in FIG. 7), 117c (in FIG. 8), and 117d (not shown) are capable to slide linearly along the tracks guided by 118a (in FIG. 7), 118b (in FIG. 7), 118c (in FIG. 8), and 118d (not shown), respectively. When the model yaws, the gear 116a (in FIG. 7) will drive the gear rack 117a and 117b to slide, and in a similar way, the gear 116b (not shown in FIG. 7) will drive the gear rack 117c and 117d (not shown in FIG. 7) to slide. When these gear racks slide, the spring and damper combinations 119a1, 119a2, 119b1, 119b2 (in FIG. 7), 119c1, 119c2 (in FIG. 8), 119d1 (not shown), and 119d2 (not shown) will extended or compressed from the original setup. Therefore, the restoring and damping functions in yaw can be achieved. To keep the model symmetric about XOY and XOZ planes, these springs and dampers are identical within one model set. However, the set of springs and dampers can be changed (all eight at a time) to vary the yaw natural frequency and damping of the model. As an example, the smallest level of yaw damping that the apparatus can achieve is the case without any dampers installed for yaw motion, meaning the spring and the damper are separated as shown in FIG. 9b and only the springs are installed. In this case the yaw damping is due to the structural fictions of the apparatus.

For roll motion, a similar restoring and damping assembly 105 (shown in FIG. 2 and FIG. 11) is installed at least on one side of the frame 104. These springs and dampers can be changed accordingly to vary the roll natural frequency and damping of the model. The assembly 105 comprises a gear rack 123, a track guide 124, a gear 125, two spring and damper combinations 122-1 and 122-2, four spring posts 121-1, 121-2, 121-3 and 121-4 as shown in FIG. 11. The gear 125 is mounted rigidly on the roll axle 108 as shown in FIG. 11. When the model rolls, it drives the roll axle 108 and the gear 125 to rotate with it. The gear 125 in turn drives the gear rack 123 to move linearly along the track guided by the bracket 124. In such way, the restoring and damping in roll is achieved. A ball bearing sitting in a hole in the frame 104 to provide a smooth rotation for the roll axle 108 is 126 as shown in FIG. 11 and another ball bearing (not shown) is located on the other end of 108. Again, the smallest roll damping can be achieved by uninstalling the two roll dampers. In this case, the damping is due to the structural frictions of the apparatus.

Figure 12A:
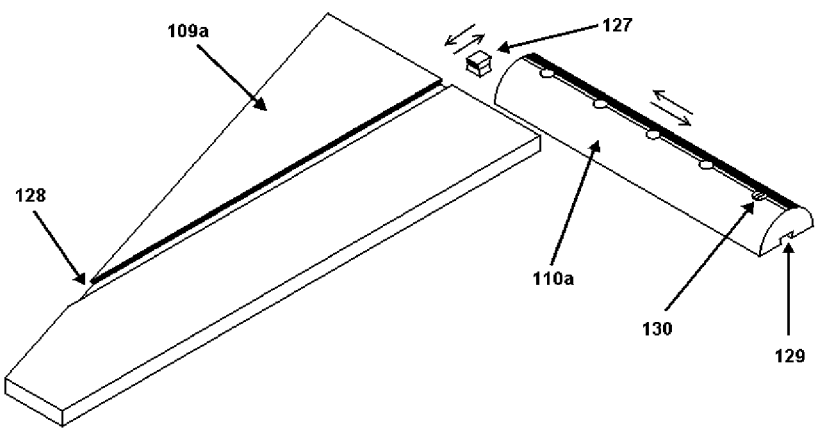
Figure 12B:
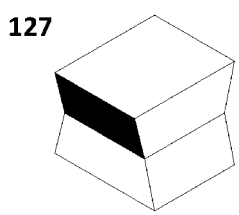
Figure 13:
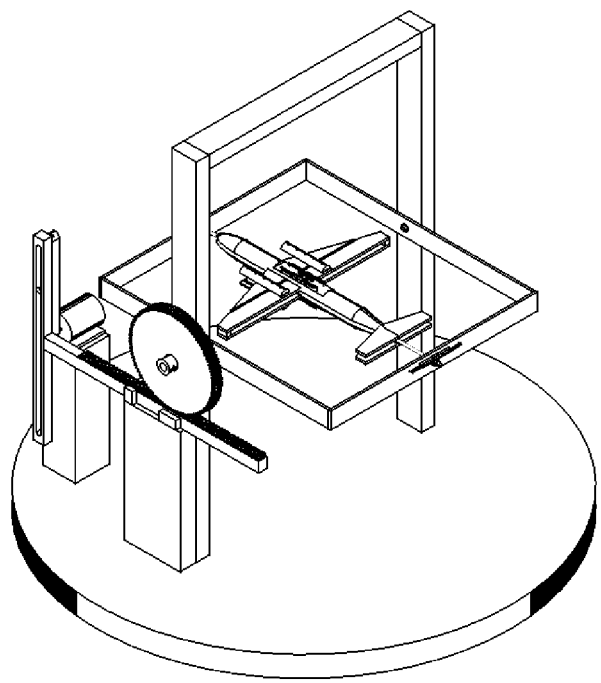
FIG. 13 is a perspective view of the apparatus with the motor-driving assembly for precision control of the external exciting moments.
Figure 14A:
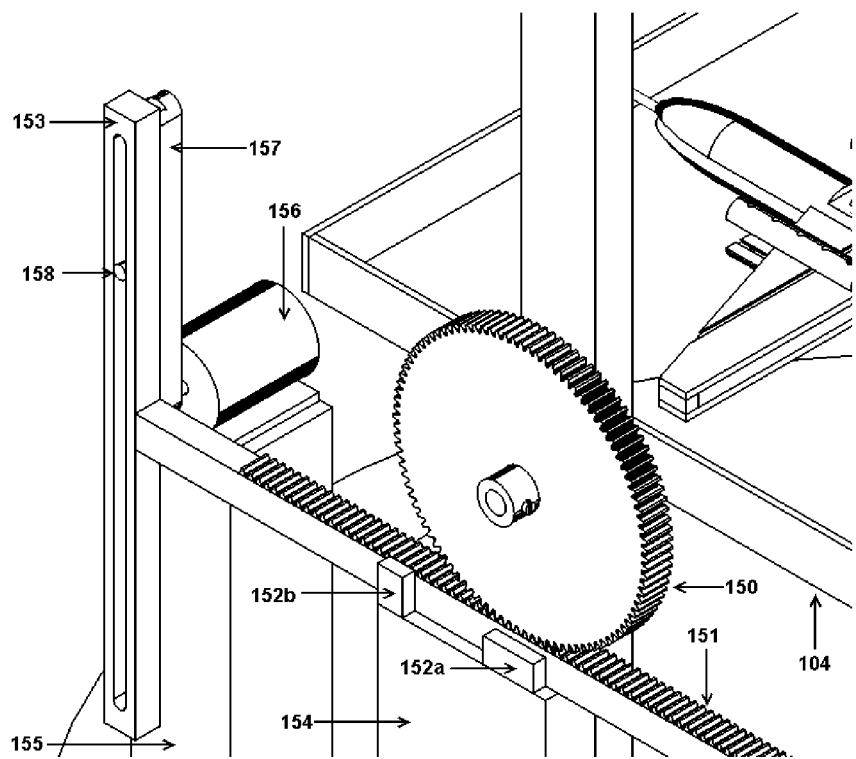
FIG. 14a is a perspective zooming-in view of the motor-driving assembly of FIG. 13.
Figure 14B:
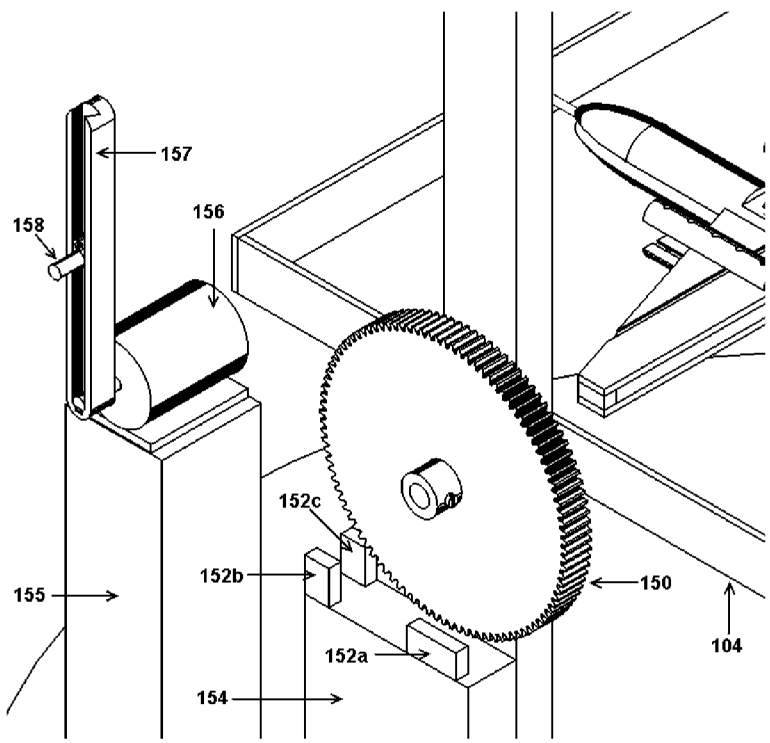
FIG. 14b is a view of FIG. 14a without the gear rack 151 and the slotted link 153.
Figure 14C:
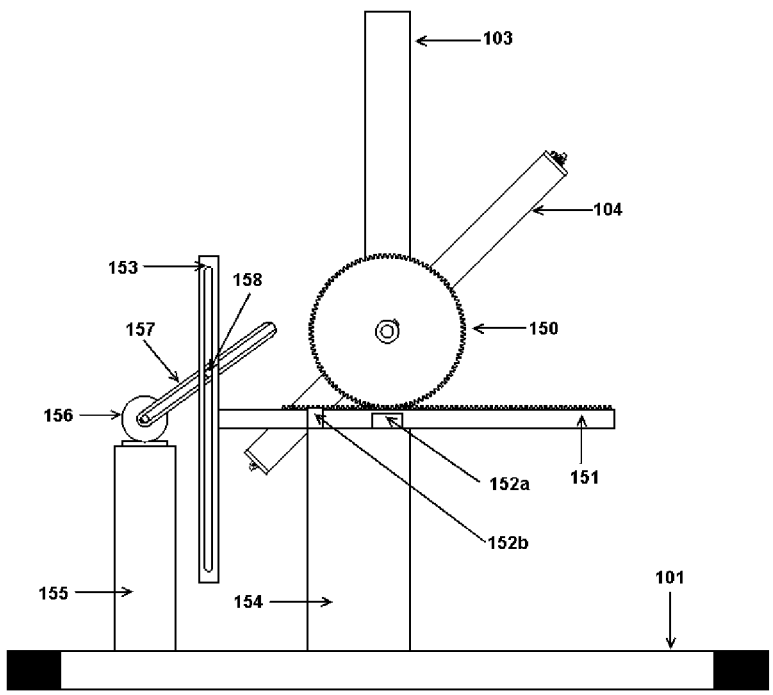
FIG. 14c is a side view of FIG. 14a with the aircraft model pitch down at 45°.

The positions of the half cylinder weights can be adjusted on the surface of the wings. For example, as shown in FIG. 12a, there are a Dovetail groove 128 on the wing 109a along the wingspan direction and a Dovetail groove 129 along the centerline of the half cylinder weight 110a which is connected with the wing 109a by a connector 127 which has Dovetail shapes on the top and bottom orthogonally as shown in FIG. 12b. The connector 127 is capable to slide along the groove 128 while the weight 110a is capable to slide on the connector 127 along the groove 129 and to be locked in position by a screw 130 on the wing 109a. An arrangement of the adjustable weight 110b on wing 109b is symmetric to that on wing 109a about the XOZ plane as shown in FIG. 3a and FIG. 6. Arrangements of the adjustable weights 110c on wing 109c and 110d on wing 109d are symmetric to that on wings 109a and 109b about XOY plane, respectively. The four adjustable weights 110a, 110b, 110c, and 110d are so positioned that the model is symmetric about XOY and XOZ planes and the center of gravity (COG) of the model is tuned to coincide with the intersection point O of roll, pitch, and yaw axes as shown in FIG. 3a.

A method for demonstrating the nonlinear instability is summarized below. The crank 102 (in FIG. 2) drives the model in a harmonic oscillation in pitch which represents a control from a pilot. Oscillation pitch motion is the necessary motion happens during takeoff and landing for aircrafts. The governing equations of roll($\varphi$), pitch($\theta$), and yaw($\psi$), of the model 106 as shown in FIG. 3b are given as, $$I_x\ddot{\varphi}+b_1\dot{\varphi}+k_1\varphi=(I_y-I_z)\dot{\theta}\dot{\psi}+M_x, \qquad \text{Math. 11}$$

$$\theta=A_{21}\cos(\omega_{21}t+\alpha_{21}), \qquad \text{Math. 12}$$

$$I_z\ddot{\psi}+b_3\dot{\psi}+k_3\psi=(I_x-I_y)\dot{\varphi}\dot{\theta}, \qquad \text{Math. 13}$$

wherein, $I_x$, $I_y$, and $I_z$ are the moment of inertias of the model 106 about X, Y and Z axes, respectively, $b_1$ and $b_3$ are the damping coefficients for roll and yaw, respectively, $k_1$ and $k_3$ are the restoring coefficients for roll and yaw, respectively, $M_x$ is the roll moment acting on the model 106 by the roll and yaw axle assembly 132 (FIG. 3c); $A_{21}$, $\omega_{21}$, and $\alpha_{21}$ are the amplitude, frequency, and phase of the pitch motion driven by the crank 102, respectively.

Since the mass distribution of the assembly 132 is close to the roll axle as shown in FIG. 3c, the roll moment of inertia of the assembly 132 is very small compared with that of the aircraft model 106. Therefore the effects of the moment $M_x$ is very small and may be neglected. So we assume $M_x$=0. This assumption is 100% accurate when the model only has pitch motions. Therefore when the crank drives the model to rotate in pitch, the governing equations of the model 106 becomes Math. 14, Math. 12, and Math.13.

$$I_x\ddot{\varphi}+b_1\dot{\varphi}+k_1\varphi=(I_y-I_z)\dot{\theta}\dot{\psi} \qquad \text{Math. 14}$$

As we know the equations Math. 14, Math. 12, and Math.13 have the following solutions, $$\varphi=0, \qquad \text{Math. 15}$$

$$\theta=A_{21}\cos(\omega_{21}t+\alpha_{21}), \qquad \text{Math. 12}$$

$$\psi=0. \qquad \text{Math. 16}$$

However, according to the theory in the inventor's book, it was found that the motions represented by Math. 15, Math. 12, and Math. 16 will become unstable, then roll and yaw motions will grow exponentially under the conditions Math. 9 and Math. 10 described above.

To do the demonstration, the moments of inertias of the model 106 as shown in FIG. 3b may be measured before it is installed on the assembly 132. After the model 106 is installed as shown in FIG. 2, the roll and yaw natural frequencies are measured by free-rotating tests to be $\omega_{10}$ and $\omega_{30}$, respectively. For example, in a prototype of the apparatus the frequencies were tuned to be about $\omega_{10}=2\pi=6.28$ and $\omega_{30}=\pi=3.14$. This means that the natural roll frequency of the prototype is 1 (1/s) and the natural yaw frequency of it is 0.5 (1/s). The damping coefficients of roll and yaw can be also measured by free-decay tests, respectively. The preferred condition for the damping is the case in which the dampers in roll and yaw directions are not installed. This is the case of the minimum damping situations and therefore two dangerous pitch amplitude thresholds given by Math. 9 and Math. 10 are minimized as well.

When the crank drives the model in a very low frequency, $\omega_{21} \ll |\omega_{10}-\omega_{30}|$ (a very long period), the aircraft model only shows pitch motions controlled by the crank, no roll and yaw motion are observed. For example, for the prototype this case means $\omega_{21} \ll 3.14$ and the driving period needs to be much longer than 2 seconds, say 4 seconds or more. When the driving frequency $\omega_{21}$ is increased and approaching to $|\omega_{10}-\omega_{30}|$ together with a pitch amplitude exceeding the threshold given by Math. 10, roll and yaw double resonances should happen. In this case, violent roll and yaw motion are observed. For example in the prototype case, the first dangerous frequency is $\omega_{21}=|\omega_{10}-\omega_{30}|=3.14$ and the pitch amplitude threshold is found by testing to be about 90°. When maintaining the same frequency at $\omega_{21}=3.14$, but decreasing the pitch amplitudes to be about 40° which is less than the threshold of 90°, a disappearance of the roll and yaw resonances should be observed, and the only motion remains is the pitch motion, meaning that the pitch motion is stable. When the crank driving frequency continues increase to the second dangerous frequency $\omega_{21}=\omega_{10}+\omega_{30}$ together with pitch amplitude exceeding the threshold value given by Math. 9, roll and yaw resonances should happen again. Since $|\omega_{10}-\omega_{30}|$ is smaller than $\omega_{10}+\omega_{30}$, the amplitude threshold based on $\omega_{21}=|\omega_{10}-\omega_{30}|$ by Math. 10 is larger than that based on $\omega_{21}=\omega_{10}+\omega_{30}$ by Math. 9. [For example for the prototype case, $|\omega_{10}-\omega_{30}|=3.14$ and $\omega_{10}+\omega_{30}=3\pi=9.42$, so the pitch amplitude threshold based on $\omega_{10}+\omega_{30}=9.42$ was 3 times smaller than the pitch amplitude threshold (about 90°) based on $\omega_{21}=|\omega_{10}-\omega_{30}|=3.14$. Therefore the pitch amplitude threshold for the second frequency $\omega_{21}=9.42$ was about 30°. When the externally excited pitch amplitude was exceeding about 30° and the externally exciting frequency was at $\omega_{21}=9.42$, the roll and yaw double resonances were observed again]. When maintaining the pitch amplitude given by Math. 9 but increasing the pitch frequency to larger than $\omega_{10}+\omega_{30}$, a disappearance of roll and yaw resonances should be observed again, and the only motion remains is pitch in this case. For the prototype case, the roll and yaw resonances were excited by the inertial moments on the right hand sides of Math. 14 and Math.13, respectively. These inertial moments are nonlinear terms and neglected in the current practice by the linearization approximation in the industry. These phenomena observed above are consistent with the predictions of the theory found and described in detail in the book written also by the inventor.

Figure 15:
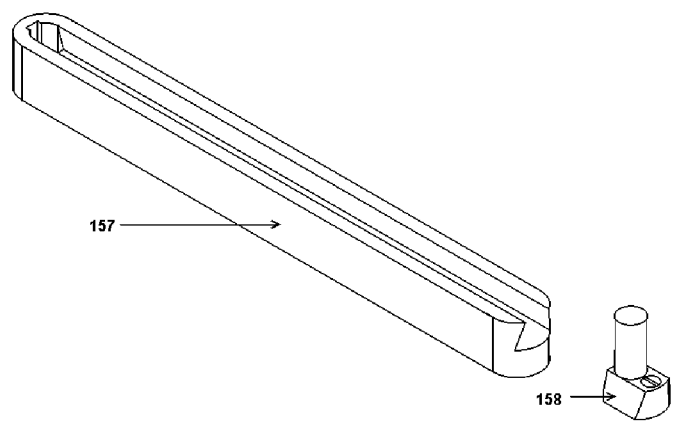
FIG. 15 is a cranking arm with the sliding pin.

In another embodiment as shown in FIG. 13, FIG. 14a, FIG. 14b, and FIG. 14c, the crank 102 in FIG. 2 is replaced by a more precise driving system which comprises a variable speed motor 156, a crank arm 157, a slider pin 158, a slotted link 153, a gear 150, a gear rack 151, track guides 152a, 152b, and 152c, a stand 155 to support the motor 156, and a stand 154 to support the gear rack 151. The slotted link 153 is rigidly connected to the gear rack 151. The effective length of the crank link 153 is adjustable by sliding and locking the slider pin 158 along the Dovetail groove in 157 as shown in FIG. 15. The setup in FIG. 13, FIG. 14a, FIG. 14b, and FIG. 14c is for demonstration purpose only to show how the motor drives the pitch rotation of the aircraft model. For a real experiment, the motor RPM and the position of the slider pin need to be adjusted according to the goal of the experiment. These adjustments are to be done according to the following formulas, Math. 17 and Math. 18. The two dangerous frequencies in terms of the RPM of the motor are calculated as $$\omega_{motor}=30|\omega_{10}-\omega_{30}|/\pi (RPM) \qquad \text{Math. 17}$$

$$\omega_{motor}=30(\omega_{10}+\omega_{30})/\pi (RMP). \qquad \text{Math. 18}$$

The pitch motion of the aircraft model is given as $$\theta=(R_1/R_2)\sin(\omega_{motor}\pi t/30)(rad), \qquad \text{Math. 19}$$

wherein $R_1$ is the effective length of the crank link 157 and $R_2$ is the radius of the gear 150. With the precise frequency and amplitude control of the pitch motions by the motor driving system, the above demonstrations can be repeated in a more precision fashion.

Figure 4:
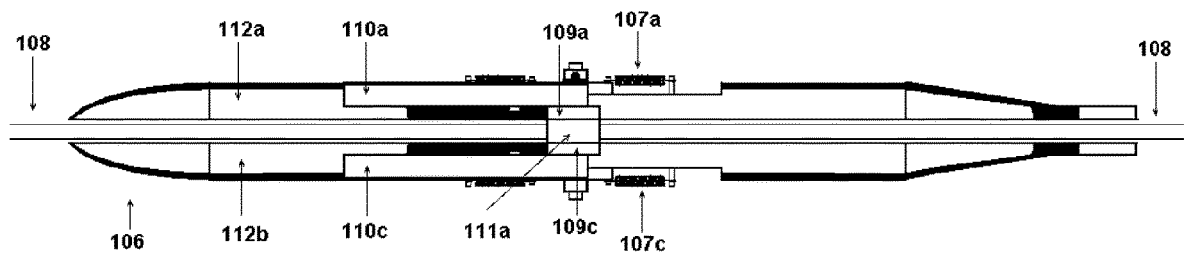
Figure 16A:
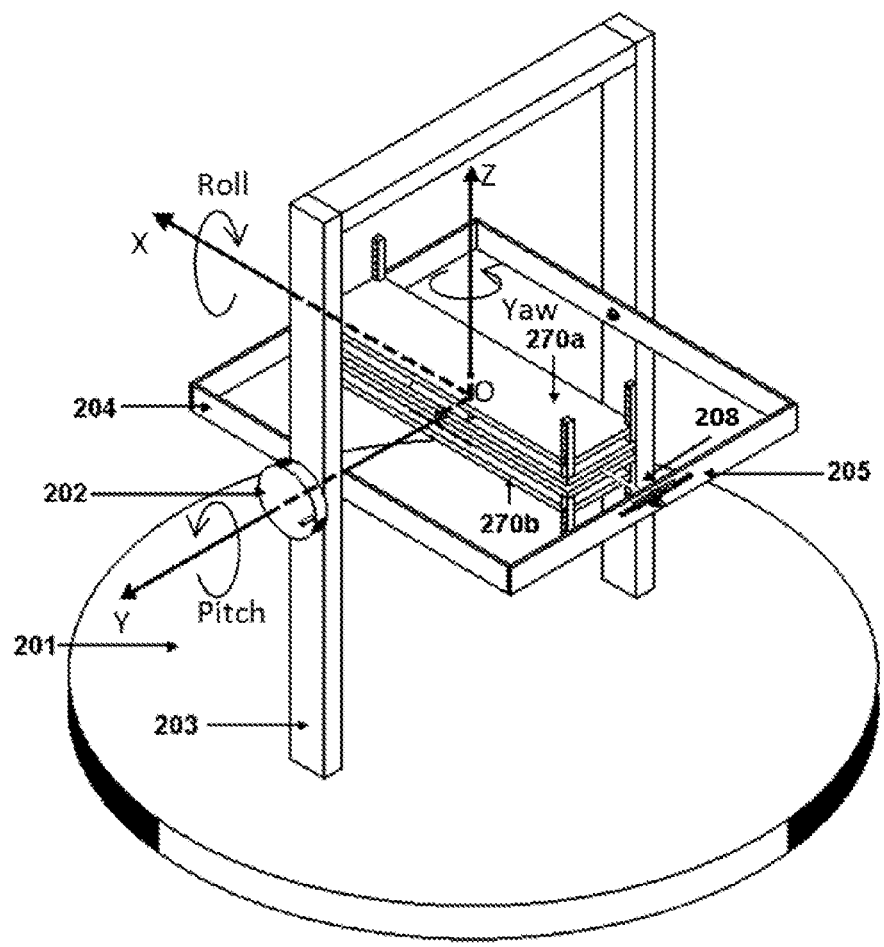
FIG. 16a is a perspective view of the apparatus with a bus model as a demonstrator related to automobiles for the case in which the pitch moment of inertia of an automobile is the intermediate between the other two inertias.
Figure 16B:
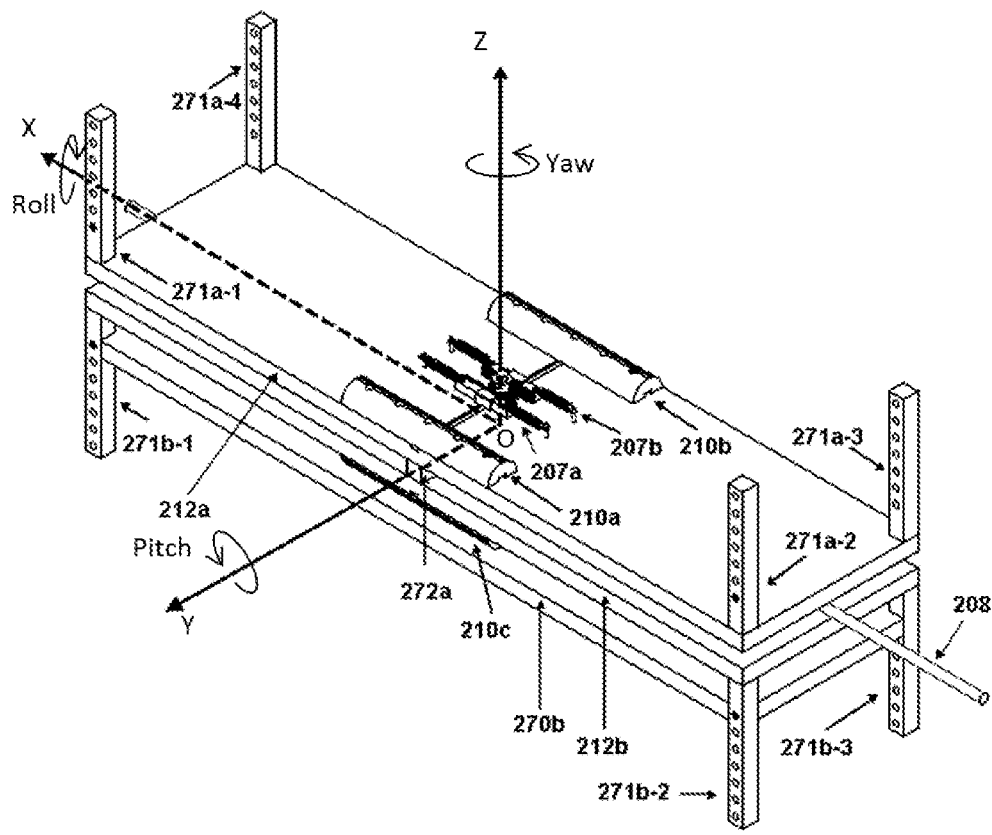

In yet another embodiment, the apparatus can be used to demonstrate the nonlinear instability of automobiles. In this case, the aircraft model discussed above is replaced by a bus model to represent an automobile as shown in FIG. 16a. The apparatus comprises a flat round base 201, an upside-down U type supporting frame 203 (the outer frame) rigidly mounted on base 201, a crank 202 rigidly connected to another rectangular frame 204 (the inner frame) runs through a bearing (not shown in the figure) which is sitting in a hole in the outer frame 203 so that the crank can smoothly rotate the inner frame 204, a bus model comprising two symmetric (top and bottom) part assemblies about XOY plane as shown in FIG. 16a is also both symmetric (left and right) about XOZ plane and symmetric (front and rear) about YOZ plane so that the principal inertial axes of the model are along the roll, pitch, and yaw axes of the model. The top and bottom parts of the bus model are only connected at the yaw axle and at the two points located at the middle of the bus by spacers 272a as shown in FIGS. 16b and 272b (not shown) which are very similar in size like 111a and 111b for the aircraft model above. The center of gravity (COG) of the bus model is located at Point O as shown in FIG. 16b which coincides with the intersection point of roll, pitch, and yaw axes. Therefore the roll, pitch, and yaw axes coincide with the X, Y and Z axes of the coordinate system as shown in FIG. 16a. A long roll axle 208 (shown in FIG. 16a and FIG. 16b) supporting the bus model is in turn supported by two bearings (not shown) at the two ends of it. The two bearings are sitting in holes in the two opposite sides of the frame 204. Yaw restoring and damping assemblies 207a and 207b are mounted on the top part as shown in FIG. 16b, two symmetric yaw restoring and damping assemblies 207c (not shown) and 207d (not shown) are mounted on the bottom part of the bus model. Rectangular plates 212a and 212b of the bus model serve as the top and bottom bases, respectively, in the same function as the top and bottom parts of the fuselage of the aircraft model above. Adjustable weight 210a, 210b, 210c, and 210d (not shown) are movable on the plates 212a and 212b along the Dovetail grooves, respectively. Square poles 271a-1, 271a-2, 271a-3, and 271a-4 as shown in FIG. 16b are used to adjust the Z position of weight 270a which is shown in FIG. 16a (not in FIG. 16b). Square poles 271b-1, 271b-2, and 271b-3 as shown in FIG. 16b, and 271b-4 (not shown) are used to adjust the Z position of weight 270b as shown in FIG. 16b. With this bus model installed in the apparatus, similar nonlinear instability phenomena as described above can be observed because automobiles share the same governing equations Math. 3, Math. 4 and Math.5 with aircrafts. Therefore they have the same symptom.

Figure 17:
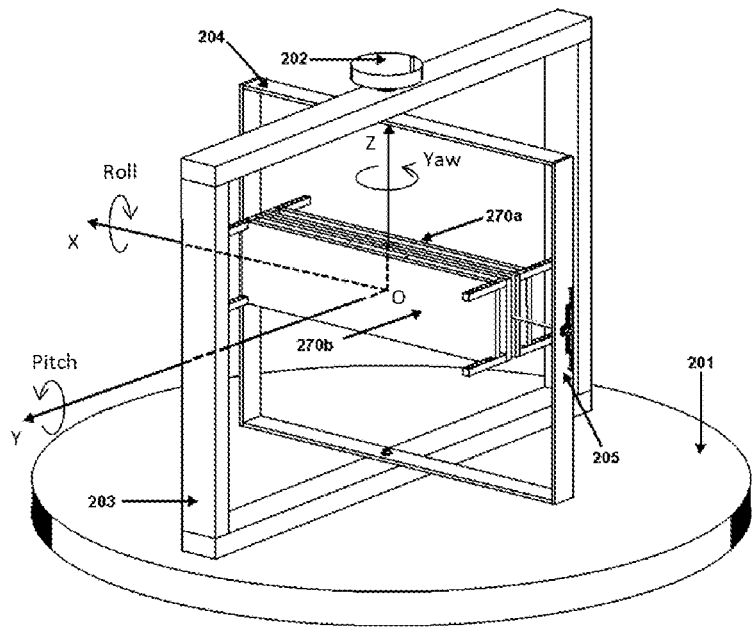
FIG. 17 is another way of mounting the model to the base in order to simulate the case in which the yaw moment of inertia of an automobile (like some loading conditions of big trucks) is the intermediate between the other two inertias.

In general for most sedans, the pitch moments of inertias are the intermediate between the other two inertias. However, for some loading conditions of some automobiles, for example big trucks, the intermediate moment of inertia may be in the yaw direction, not in pitch. In this case the automobile will show nonlinear yaw instability instead of pitch. In order to show this yaw instability, the bus model is installed in a different way as shown in FIG. 17 wherein the crank is driving the model in yaw direction instead of pitch.

Figure 18:
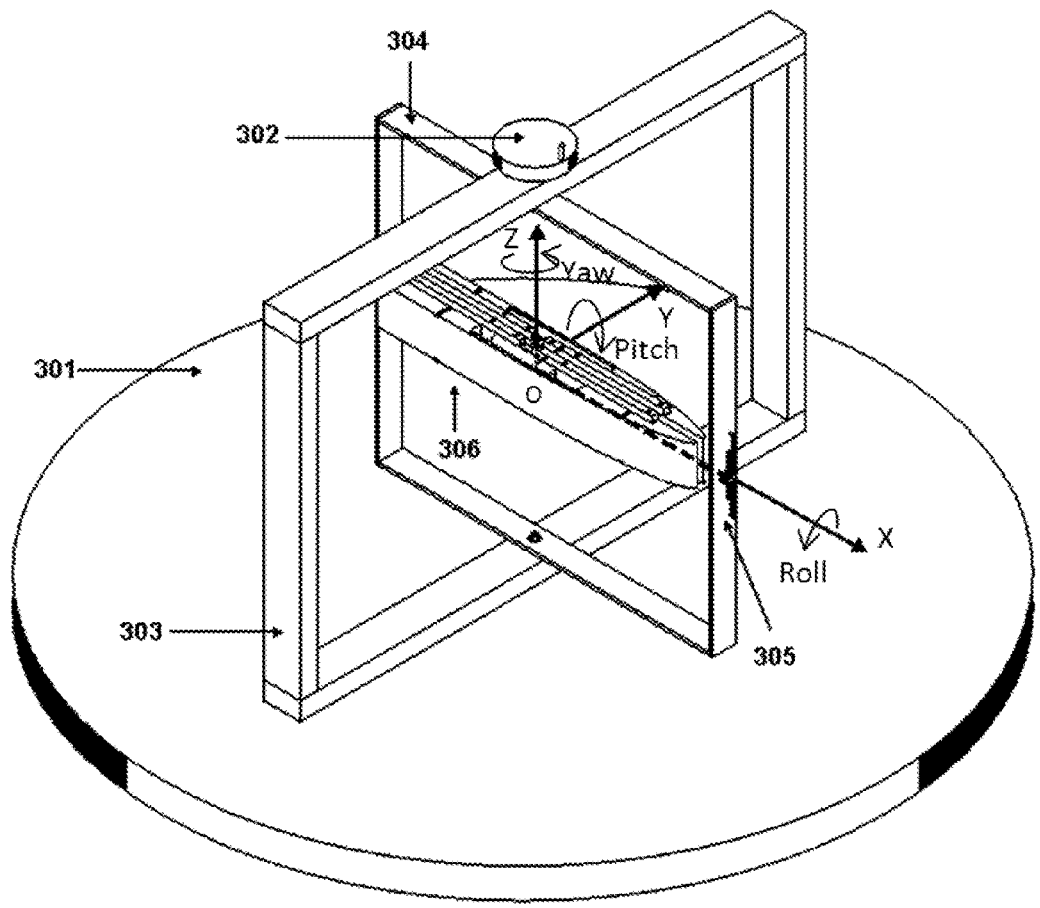
FIG. 18 is a perspective view of the apparatus with a ship model as a demonstrator related to ocean vehicles.
Figure 19:
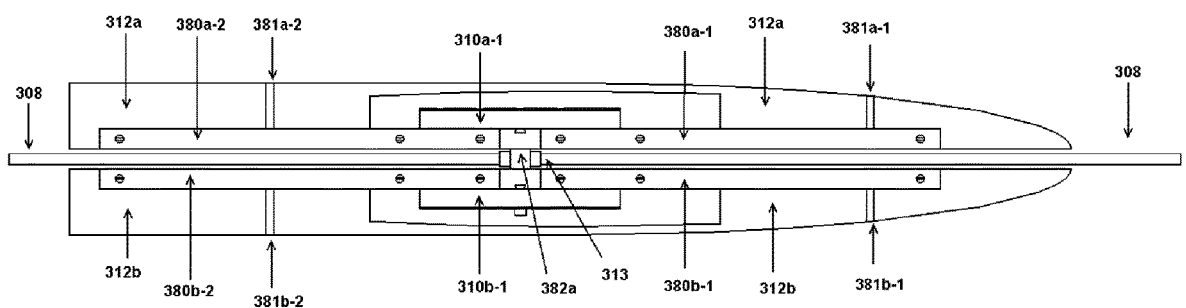
FIG. 19 is a top view of the ship model of FIG. 18 without the supporting frames.
Figure 20:
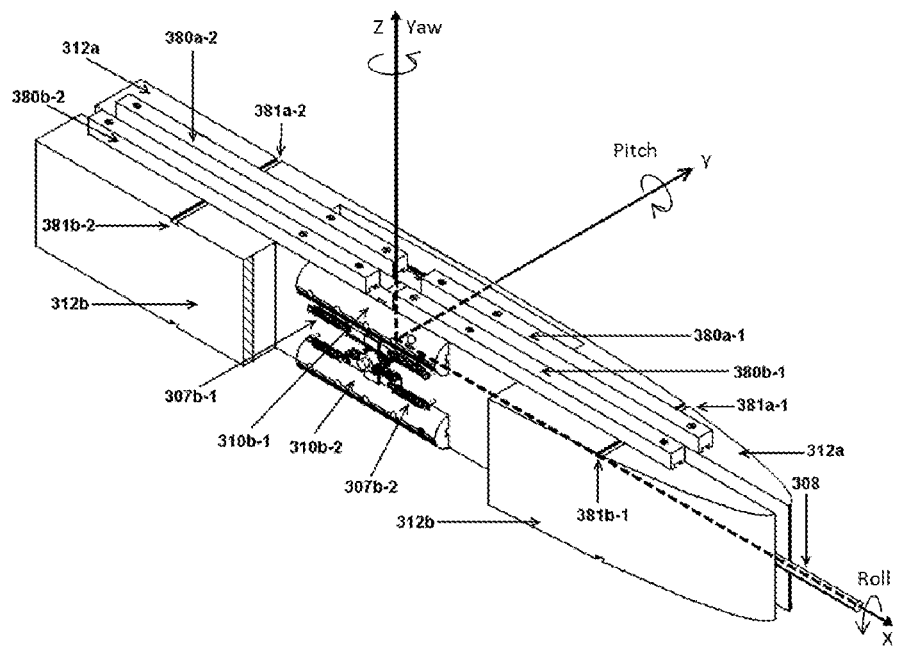
FIG. 20 is a zooming-in perspective view of the ship model of FIG. 18 without the supporting frame and with a shell section cut out amidships.

In still yet another embodiment, the apparatus can be used to demonstrate nonlinear yaw instability of ocean going vessels, for example, containership. A ship model 306 with the yaw moment of inertia being the intermediate is installed on the apparatus as shown in FIG. 18. In general, a ship pitch moment of inertial is the intermediate one, but in some loading conditions, a ship can be loaded so that the yaw moment of inertial becomes the intermediate, this is especially true for containerships. This apparatus comprises a base 301, a crank 302 going through an outer frame 303 to be able to rotate an inner frame 304, a similar roll restoring and damping assembly 305 is mounted on the inner frame 304. A top view of the ship model is given in FIG. 19. As shown in FIG. 19, the ship model comprises two parts 312a (left) and 312b (right). The two-parts arrangement is similar as all models discussed above. The two parts are connected only at the pitch axle and at the two points along the yaw axle by the spacers 382a and 382b (not shown). The two parts 312a and 312b each have big cut-out amidships to make a room for the pitch restoring and damping assemblies as shown in FIG. 20. The ship model again is symmetric about XOY and XOZ planes. A long roll axle 308 connected with two pitch axles by a cross connector 313 shown in FIG. 19, similar as that shown in FIG. 3c, supports the model at center of the gravity. Adjustable weights 380a-1, 380a-2, 380b-1, and 380b-2 are movable along Dovetail grooves 381a-1, 381a-2, 381b-1, and 381b-2, respectively on the horizontal plane while adjustable weights 310b-1 and 310b-2 are movable in a similar way in a vertical plane as shown in FIG. 20.

The roll and pitch restoring, and damping coefficients of the ship model are adjustable to match a real ship data measured by free-decay tests so that these coefficients include the added mass effects. Therefore the roll and pitch natural frequencies of the ship model are the same as that of the ship it is simulating, respectively. To demonstrate the nonlinear yaw instability in following and quartering seas of which the roll and pitch damping coefficients are the minimum, a preferred setup is the case without any damper installed, which represents the minimum damping effect the apparatus can achieve. Since the yaw moment of inertial is the intermediate one, the yaw amplitude thresholds and the critical frequencies for nonlinear instability are given as $$A_{Y-TH} = \frac{1}{\omega_{31}} \sqrt{\frac{b_1 b_2}{(I_y - I_z)(I_z - I_x)}} \text{ and}$$
$$\omega_{31} = \omega_{10} + \omega_{20},$$

Math. 20

$$A_{Y-TH} = \frac{1}{\omega_{31}} \sqrt{\frac{b_1 b_2}{(I_y - I_z)(I_z - I_x)}} \text{ and}$$
$$\omega_{31} = |\omega_{10} - \omega_{20}|,$$

Math. 21 wherein $\omega_{10}$ and $\omega_{20}$ are the roll and pitch natural frequencies of a ship including added mass effects, respectively; $b_1$ and $b_2$ are the damping coefficients in roll and pitch of a ship including added mass effects, respectively; $I_x, I_y, I_z$ are the moment of inertias in roll, pitch, and yaw of a ship in the air, respectively. The nonlinear instability theory in the inventor's book says that the yaw motion is stable until the yaw amplitude reaches the threshold values $A_{Y-TH}$ and at the critical frequencies $\omega_{31}$ given in Math. 20 or Math. 21. Therefore a similar demonstration like that for the aircraft model discussed above can be performed using this apparatus.

Figure 21:
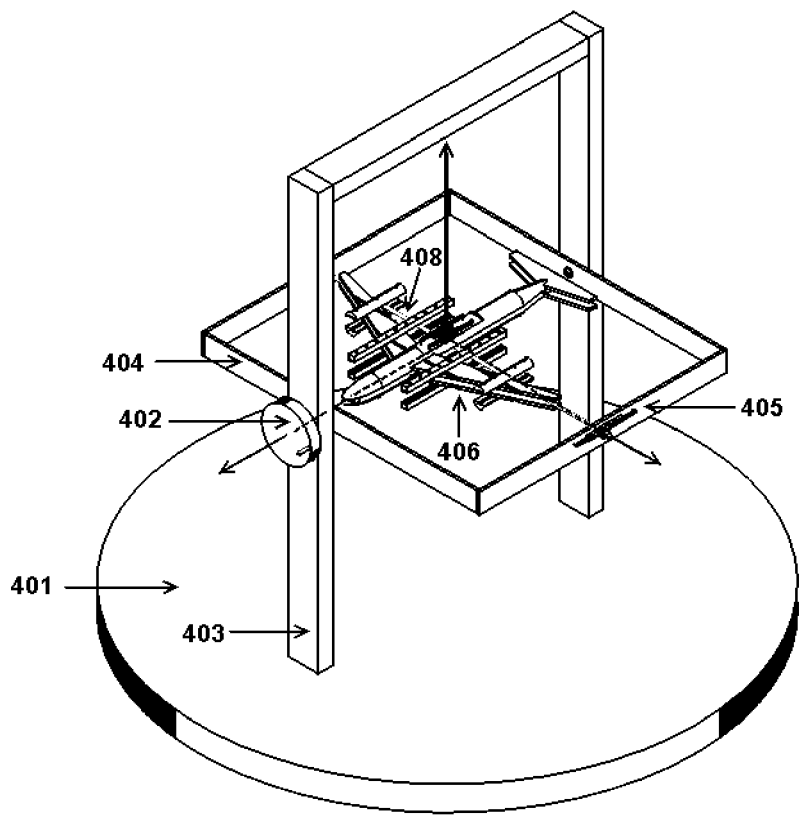
FIG. 21 is a perspective view of the apparatus with an aircraft model which has the roll moment of inertia as the intermediate between the other two inertias.
Figure 22:
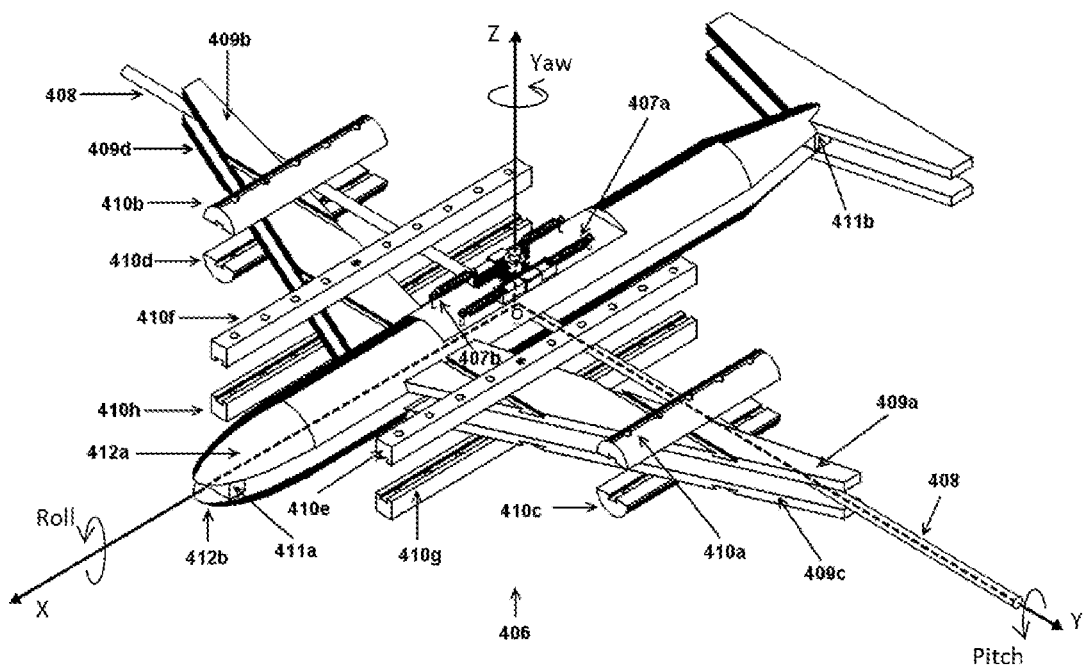
FIG. 22 is the zooming-in view of FIG. 21 without the supporting frames.

In further yet another embodiment, the apparatus can be used to demonstrate the nonlinear roll instability for some type of aircrafts of which the roll moment of inertia is the intermediate between the pitch and yaw inertias, for example, B52 aircraft with a longer wingspan than the length which makes the roll moment of inertia exceed the pitch moment of inertia. In this case, the original aircraft model in FIG. 2 is replaced by another aircraft model with longer wingspan and more adjustable weights on the wings as shown in FIG. 21. The similar apparatus comprises an aircraft model 406, a base 401, an outer frame 403, a crank 402, an inner frame 404, a pitch restoring and damping assembly 405 and a long pitch axle 408. Again the model is symmetric about XOY and XOZ planes and the center of gravity is adjusted to locate at the origin O of the coordinate system as shown in FIG. 22. The model comprises a top part 412a and a bottom part 412b. Again 412a and 412b are connected only at the yaw axle and at the two points along the roll axis by spacers 411a and 411b as shown in FIG. 22. Adjustable weights 410a, 410e, 410b, 410f, 410c, 410g, 410d, and 410h are moveable along the Dovetail grooves on wings 409a, 409b, 409c, and 409d, and along the Dovetail grooves on the weights, respectively, by connecting to similar connectors (not shown) like 127 in FIG. 12b. These adjustable weights are used to adjust the moment of inertias of the aircraft model. Similar yaw restoring and damping assemblies are mounted on the top and bottom parts of the model, for example, assemblies 407a and 407b on the top part.

Since the roll moment of inertia is the intermediate, the roll amplitude thresholds and the critical frequencies are given as $$A_{R-TH} = \frac{1}{\omega_{11}} \sqrt{\frac{b_2 b_3}{(I_z - I_x)(I_x - I_y)}} \text{ and}$$
$$\omega_{11} = \omega_{20} + \omega_{30},$$

Math. 22

$$A_{R-TH} = \frac{1}{\omega_{11}} \sqrt{\frac{b_2 b_3}{(I_z - I_x)(I_x - I_y)}} \text{ and}$$
$$\omega_{11} = |\omega_{20} - \omega_{30}|,$$

Math. 23 wherein $\omega_{20}$ and $\omega_{30}$ are the pitch and yaw natural frequencies of the aircraft model, respectively; $b_2$ and $b_3$ are the damping coefficients in pitch and yaw of the model, respectively; $I_x, I_y, I_z$ are the moment of inertias in roll, pitch, and yaw of the model, respectively. The nonlinear instability theory in the inventor's book shows that the roll motion is stable until the roll amplitude reaches the threshold values $A_{R-TH}$ and at the critical frequencies $\omega_{11}$ given in Math. 22 or Math. 23. Therefore a similar demonstration like that for the aircraft model in FIG. 2 discussed above can be performed using this apparatus.

Figure 23:
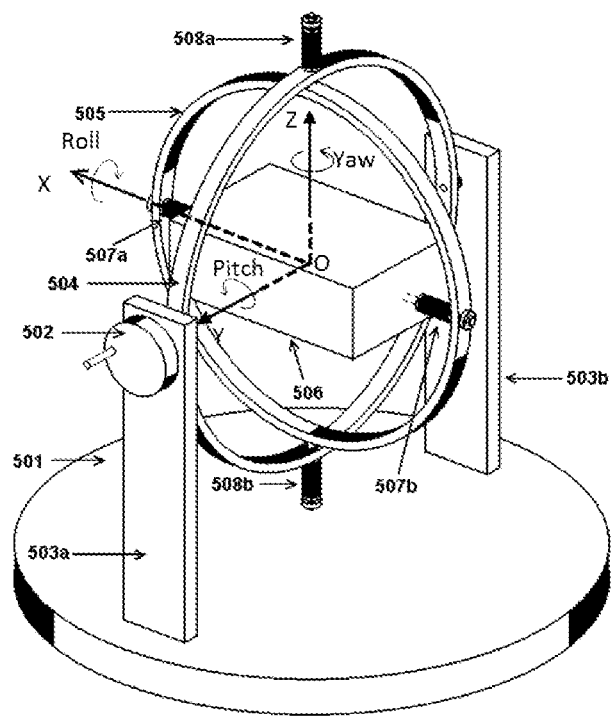
FIG. 23 is a perspective view of an apparatus with a rigid body model of rectangular block.

In further yet another embodiment, a general-case apparatus with a three-gimbaled framework is illustrated in FIG. 23. This apparatus comprises a base 501; a crank 502; stanchions 503a and 503b; an outer ring 504; an inner ring 505; a rectangular block 506; roll restoring and damping assemblies 507a and 507b; yaw restoring and damping assemblies 508a and 508b. The rectangular block has three different moments of inertias such as the roll moment of inertia to be the smallest, the pitch moment of inertia the intermediate, and the yaw moment of inertia the largest. The block is symmetrically mounted in the apparatus with the principal roll, pitch, and yaw axes of the block to be aligned with the roll, pitch, and yaw axles, respectively as shown in FIG. 23. A roll axle is rigidly connected with the block and aligns with the roll axis as shown in FIG. 23. The roll axle is supported at the two ends by two bearings (not shown in FIG. 23) which are sitting in the holes on the inner ring 505 such that the block is smoothly rotate about the roll axle. Another two bearings (not shown in FIG. 23) are sitting in the holes at the top and bottom of the outer ring 504 along the yaw axis. Two yaw axles are rigidly and perpendicularly connected to the inner ring 505 at the top and bottom, respectively as shown in FIG. 23. The yaw axles go through the bearings sitting in the outer ring 504 to provide a smooth rotation of the block together with the inner ring 505 about the yaw axis. Yet another two bearings are sitting in the holes on stanchion 503a and 503b in a similar way to provide smooth rotation of the outer ring 504 about the pitch axis. The crank 502 is rigidly connected to the outer ring 504 by a shaft (not shown) through a bearing in stanchion 503a and able to apply external pitching moment on the ring 504.

Figure 24:
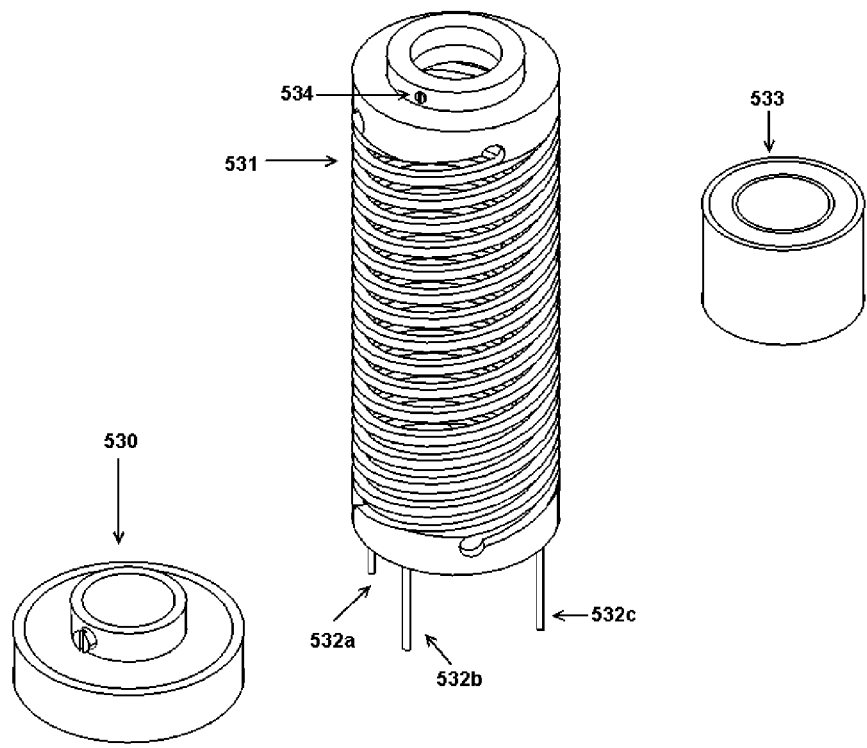
FIG. 24 is a perspective view of the individual elements of the restoring and damping assembly.
Figure 25:
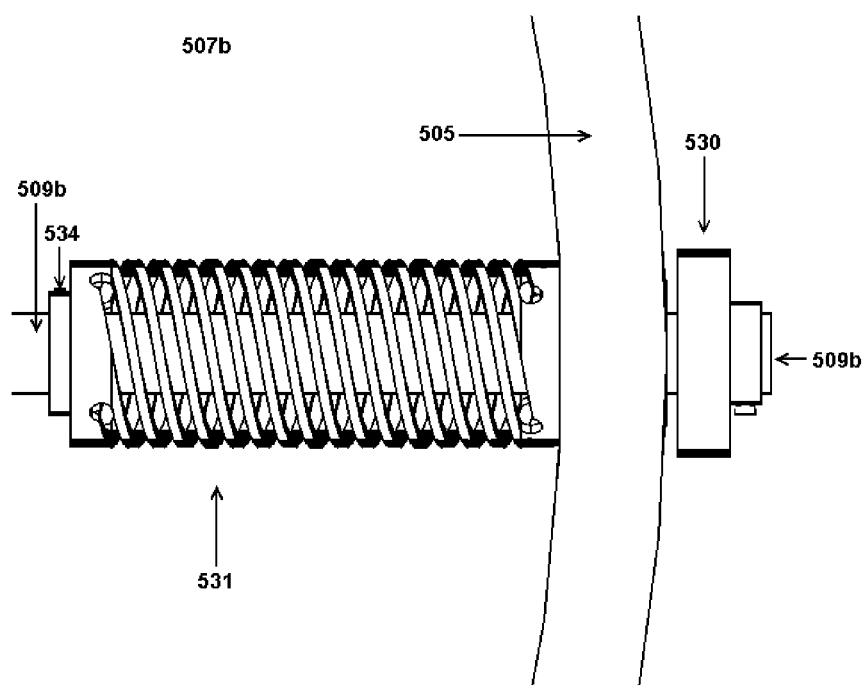
FIG. 25 is a side view of one of the roll restoring and damping assembly.
Figure 26:
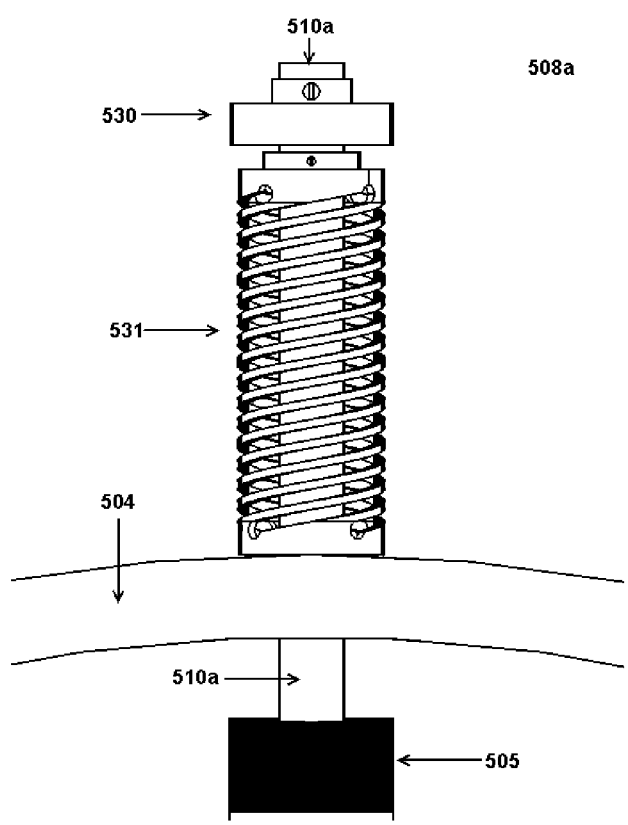
FIG. 26 is a side view of one of the yaw restoring and damping assembly.

There are two roll restoring and damping assemblies 507a and 507b, and two yaw restoring and damping assemblies 508a and 508b. Each of these assemblies includes a machined torsional spring 531, a torsional damper 530, and a bearing 533 as shown in FIG. 24. The machined torsional spring 531 is capable to be mounted and tied on rotational axle (roll or yaw) on one end by a screw 534 and on the other end the torsional spring has four cylindrical legs 532a, 532b, 532c as shown in FIG. 24, and 532d (not shown) which are capable to slide smoothly into cylindrical holes (not shown) on the outer ring 504 or the inner ring 505 such that this end of the torsional spring has no freedom of motion transversely on the ring (either 504 or 505) and the other end of the spring is capable to rotate with either the roll axle or the yaw axle. For example, FIG. 25 shows the side view of the assembly 507b. The spring 531 is tied on the roll axle 509b by screw 534 and the other end of 531 is connected by the four legs (not shown in FIG. 25) on the outer ring 505. The roll axle 509b is rigidly fixed on one end along the roll direction on the block 506 as shown in FIG. 23 and the other end of the roll axle 509b is through a bearing (not shown) which is embedded in the inner ring 505. The rotational damper 530 is mounted outside of the inner ring 505 and on the end of the roll axle 509b as shown in FIG. 25. The restoring and damping assembly 507a is a mirror of the assembly 507b about the YOZ plane as shown in FIG. 23. As another example, FIG. 26 shows the side view of the assembly 508a. The yaw axle 510a is through a bearing (not shown) which is embedded in the outer ring 504. One end of 510a is fixed with the inner ring 505 as shown in FIG. 26. One end of the torsional spring 531 is tied on the yaw axle 510a outside of the outer ring 504. The other end of 531 is connected to the outer ring 504 by the four legs of the spring (not shown) so that the torsional spring is capable to rotate only on one end with the yaw axle 510a. The four legs of the spring are free sliding in the four holes in the ring 504. The torsional damper 530 is mounted at the far ends of the yaw axle 510a in order to be easily taken off for the minimum damping case as discussed before. In this case, the damping of the system is only due to the structural frictions of the apparatus. The restoring and damping assembly 508b is a mirror of the assembly 508a about the XOY plane as shown in FIG. 23. A similar demonstration, as shown in the case of the aircraft model in FIG. 2, about the nonlinear pitch instability of the rectangular block can be performed by this general-case apparatus.

It should be understood that the detailed descriptions and specific examples, while indicating the preferred embodiments, are intended for purposes of illustration only and it should be understood that it may be embodied in a large variety of forms different from the one specifically shown and described without departing from the scope and spirit of the invention. For example, one modification may be as that the top part of the aircraft model in FIG. 3b may be asymmetric with the bottom part of the model, but the principal inertia axe of roll still aligns with the roll axe of the model and all the demonstrations described above could be achieved by such modified model. It should be also understood that the invention is not limited to the specific features shown, but that the means and construction herein disclosed comprise a preferred form of putting the invention into effect, and the invention therefore claimed in any of its forms of modifications within the legitimate and valid scope of the appended claims.

What is claimed is:

1. A method of simulating three-degrees of freedom vehicle nonlinear rotational instability comprising:
   a. attaching a vehicle model to a three-gimbaled framework, wherein said vehicle model includes one top piece and one bottom piece, wherein said top and bottom pieces are identical and symmetric at least about the vertical plane which contains their longitudinal centerlines when said top and bottom pieces are in horizontal position, respectively, a two-axle-combination shaft providing two orthogonal axles about which said vehicle model rotates, wherein said top and bottom pieces are rigidly connected at two points, wherein said two points are located along a direction perpendicular to a two-axle plane which said two orthogonal axles form, wherein said two orthogonal axles coincide with the smallest and the largest principal axes of said vehicle model, respectively;
   b. a plurality of restoring and damping mechanisms in the directions of the smallest and the largest principal axes of inertia of said vehicle model, wherein said restoring and damping mechanisms comprise springs, dampers, gears, gear racks, posts, and guide brackets;
   c. a rotatable frame to provide controllable rotations about the intermediate principal axis of inertia of said vehicle model, wherein said rotatable frame is rotatably coupled to supporting elements and a motor driving system;
   d. a plurality of identical loads slidable on said vehicle model for adjustments of moments of inertias for said vehicle model;
   e. wherein said rotatable frame is capable of rotating in oscillation fashions with a range of amplitudes and a range of frequencies to demonstrate the nonlinear instability of rotations about the intermediate principal of axis of said vehicle model, wherein said amplitudes and frequencies are controlled precisely by said motor driving system, wherein said amplitudes cover a range given by $$\left\{\frac{0.5}{\omega_{10}+\omega_{30}}\sqrt{\frac{b_1 b_3}{(I_z-I_y)(I_y-I_x)}}, \frac{2}{|\omega_{10}-\omega_{30}|}\sqrt{\frac{b_1 b_3}{(I_z-I_y)(I_y-I_x)}}\right\},$$

wherein $\omega_{10}$ and $\omega_{30}$ is the natural circular frequencies about the smallest and the largest principal axes of inertias of said vehicle model, respectively, $b_1$ and $b_3$ are the damping coefficients about the smallest and the largest principal axes of inertia of said vehicle model, respectively, $I_x, I_y, I_z$ are the moments of inertias of said vehicle model about the principal axes X,Y,Z, respectively, and with $I_x<I_y<I_z$, wherein said frequencies cover a range given by $$\{0.1|\omega_{10}-\omega_{30}|, 2(\omega_{10}+\omega_{30})\},$$

wherein two dangerous frequencies are controlled by said motor driving system in terms of motor RPM given, respectively, by $$\omega_{motor}=30|\omega_{10}-\omega_{30}|/\pi(\text{RPM})$$

$$\omega_{motor}=30(\omega_{10}+\omega_{30})/\pi(\text{RPM}),$$

wherein $\omega_{motor}$ is revolutions of motor shaft per minute, wherein said oscillation fashions are given by $$\theta=(R_1/R_2)\sin(\omega_{motor}\pi t/30)(\text{rad}),$$

wherein $\theta$ is a rotational motion of said rotatable frame, $R_1$ is an effective length of a crank of said motor driving system, $R_2$ is a radius of a gear of said motor driving system, demonstrating the first frequency case of said two dangerous frequencies by, fixing said motor RPM precisely at $30|\omega_{10}-\omega_{30}|/\pi$ then changing said amplitude when said amplitude exceeds a threshold given by $$A_{P\_TH}=\frac{1}{|\omega_{10}-\omega_{30}|}\sqrt{\frac{b_1 b_3}{(I_z-I_y)(I_y-I_x)}},$$

said rotating in oscillation about the intermediate principal of axis becoming unstable, demonstrating the second frequency case of said two dangerous frequencies by fixing said motor RPM precisely at $30(\omega_{10}+\omega_{30})/\pi$ then changing said amplitude when said amplitude exceeds a threshold given by $$A_{P\_TH}=\frac{1}{\omega_{10}+\omega_{30}}\sqrt{\frac{b_1 b_3}{(I_z-I_y)(I_y-I_x)}},$$

said rotating in oscillation about the intermediate principal of axis becoming unstable.

2. A method of simulating three-degrees of freedom vehicle nonlinear rotational instability comprising:
attaching a three-gimbaled framework to a vehicle model, wherein said vehicle model includes one top piece and one bottom piece, wherein said top and bottom pieces are identical and symmetric at least about the vertical plane which contains their longitudinal centerlines when said top and bottom pieces are in horizontal position, respectively, a two-axle-combination shaft providing two orthogonal axles about which said vehicle model rotates, wherein said top and bottom pieces are rigidly connected at two points, wherein said two points are located along a direction perpendicular to a two-axle plane which said two orthogonal axles form, wherein said two orthogonal axles coincide with the smallest and the largest principal axes of said vehicle model, respectively;
a plurality of restoring and damping mechanisms in the directions of the smallest and the largest principal axes of inertia of said vehicle model, wherein said restoring and damping mechanisms comprise springs, dampers, gears, gear racks, posts, and guide brackets;
a rotatable frame to provide controllable rotations about the intermediate principal axis of inertia of said vehicle model, wherein said rotatable frame is rotatably coupled to supporting elements and a crank;
a plurality of identical loads slidable on said vehicle model for adjustments of moments of inertias for said vehicle model;
wherein said rotatable frame is capable of rotating in oscillation fashions with a range of amplitudes and a range of frequencies to demonstrate the nonlinear instability of rotations about the intermediate principal of axis of said vehicle model, wherein said amplitudes and frequencies are controlled by said crank, wherein said amplitudes cover a range given by $$\left\{\frac{0.5}{\omega_{10}+\omega_{30}}\sqrt{\frac{b_1 b_3}{(I_z-I_y)(I_y-I_x)}}, \frac{2}{|\omega_{10}-\omega_{30}|}\sqrt{\frac{b_1 b_3}{(I_z-I_y)(I_y-I_x)}}\right\},$$

wherein $\omega_{10}$ and $\omega_{30}$ is the natural circular frequencies about the smallest and the largest principal axes of inertias of said vehicle model, respectively, $b_1$ and $b_3$ are the damping coefficients about the smallest and the largest principal axes of inertia of said vehicle model, respectively, $I_x, I_y, I_z$ are the moments of inertias of said vehicle model about the principal axes X,Y,Z, respectively, and with $I_x<I_y<I_z$, wherein said frequencies cover a range given by $$\{0.1|\omega_{10}-\omega_{30}|, 2(\omega_{10}+\omega_{30})\},$$

demonstrating the first frequency case of said two dangerous frequencies by fixing said frequency at $|\omega_{10}-\omega_{30}|$ then changing said amplitude when said amplitude exceeds a threshold given by $$A_{P\_TH}=\frac{1}{|\omega_{10}-\omega_{30}|}\sqrt{\frac{b_1 b_3}{(I_z-I_y)(I_y-I_x)}},$$

said rotating in oscillation about the intermediate principal of axis becoming unstable,
demonstrating the second frequency case of said two dangerous frequencies by fixing said frequency at $(\omega_{10}+\omega_{30})$ then changing said amplitude when said amplitude exceeds a threshold given by $$A_{P\_TH}=\frac{1}{\omega_{10}+\omega_{30}}\sqrt{\frac{b_1 b_3}{(I_z-I_y)(I_y-I_x)}},$$

said rotating in oscillation about the intermediate principal of axis becoming unstable.

3. A method of simulating three-degrees of freedom rigid body nonlinear rotational instability comprising:
a. a homogeneous rectangular block model attached to a three-gimbaled framework, wherein a shaft aligns with either the smallest or the largest principal axis of inertia of said block model, wherein said three-gimbaled framework comprises an inner gimbal frame and an outer gimbal frame providing rotational freedoms for said block model;

a plurality of restoring and damping assemblies in the directions of the smallest and the largest principal axes of inertia of said block model, wherein said restoring and damping assemblies comprise machined springs with a plurality of cylindrical legs, rotational dampers, and bearings, wherein said cylindrical legs are slidable smoothly in a plurality of holes in said gimbal frames;

b. said outer gimbal frame is rotatably coupled to supporting elements and a motor driving system to provide controllable rotations about the intermediate principal axis of inertia of said block model;

c. said outer gimbal frame is capable of rotating in oscillation fashions with a range of amplitudes and a range of frequencies to demonstrate the nonlinear instability of rotations about the intermediate principal of axis of said block model, wherein said amplitudes and frequencies are controlled precisely by said motor driving system, wherein said amplitudes cover a range given by $$\left\{ \frac{0.5}{\omega_{10}+\omega_{30}} \sqrt{\frac{b_1 b_3}{(I_z-I_y)(I_y-I_x)}}, \frac{2}{|\omega_{10}-\omega_{30}|} \sqrt{\frac{b_1 b_3}{(I_z-I_y)(I_y-I_x)}} \right\},$$

wherein $\omega_{10}$ and $\omega_{30}$ is the natural circular frequencies about the smallest and the largest principal axes of inertias of said block model, respectively, $b_1$ and $b_3$ are the damping coefficients about the smallest and the largest principal axes of inertia of said block model, respectively, $I_x, I_y, I_z$ are the moments of inertias of said block model about the principal axes X,Y,Z, respectively, and with $I_x<I_y<I_z$, wherein said frequencies cover a range given by $$\{0.1|\omega_{10}-\omega_{30}|, 2(\omega_{10}+\omega_{30})\},$$

wherein two dangerous frequencies are controlled by said motor driving system in terms of motor RPM given, respectively, by $$\omega_{motor}=30|\omega_{10}-\omega_{30}|/\pi (\text{RPM})$$

$$\omega_{motor}=30(\omega_{10}+\omega_{30})/\pi (\text{RPM}),$$

wherein $\omega_{motor}$ is revolutions of motor shaft per minute, wherein said oscillation fashions are given by $$\theta=(R_1/R_2)\sin(\omega_{motor}\pi t/30)(\text{rad}),$$

wherein $\theta$ is a rotational motion of said outer gimbal frame, $R_1$ is an effective length of a crank of said motor driving system, $R_2$ is a radius of a gear of said motor driving system, demonstrating the first frequency case of said two dangerous frequencies by fixing said motor RPM precisely at $30|\omega_{10}-\omega_{30}|/\pi$ then changing said amplitude when said amplitude exceeds a threshold given by $$A_{P-TH} = \frac{1}{|\omega_{10}-\omega_{30}|} \sqrt{\frac{b_1 b_3}{(I_z-I_y)(I_y-I_x)}},$$

said rotating in oscillation about the intermediate principal of axis becoming unstable, demonstrating the second frequency case of said two dangerous frequencies by fixing said motor RPM precisely at $30(\omega_{10}+\omega_{30})/\pi$ then changing said amplitude when said amplitude exceeds a threshold given by $$A_{P-TH} = \frac{1}{\omega_{10}+\omega_{30}} \sqrt{\frac{b_1 b_3}{(I_z-I_y)(I_y-I_x)}},$$

said rotating in oscillation about the intermediate principal of axis becoming unstable.

4. A method of simulating three-degrees of freedom rigid body nonlinear rotational instability comprising:

a homogeneous rectangular block model attached to a three-gimbaled framework, wherein a shaft aligns with either the smallest or the largest principal axis of inertia of said block model, wherein said three-gimbaled framework comprises an inner gimbal frame and an outer gimbal frame providing rotational freedoms for said block model;

a plurality of restoring and damping assemblies in the directions of the smallest and the largest principal axes of inertia of said block model, wherein said restoring and damping assemblies comprise machined springs with a plurality of cylindrical legs, rotational dampers, and bearings, wherein said cylindrical legs are slidable smoothly in a plurality of holes in said gimbal frames;

said outer gimbal frame is rotatably coupled to supporting elements and a crank to provide controllable rotations about the intermediate principal axis of inertia of said block model;

said outer gimbal frame is capable of rotating in oscillation fashions with a range of amplitudes and a range of frequencies to demonstrate the nonlinear instability of rotations about the intermediate principal of axis of said block model, wherein said amplitudes and frequencies are controlled by said crank, wherein said amplitudes cover a range given by $$\left\{ \frac{0.5}{\omega_{10}+\omega_{30}} \sqrt{\frac{b_1 b_3}{(I_z-I_y)(I_y-I_x)}}, \frac{2}{|\omega_{10}-\omega_{30}|} \sqrt{\frac{b_1 b_3}{(I_z-I_y)(I_y-I_x)}} \right\},$$

wherein $\omega_{10}$ and $\omega_{30}$ is the natural circular frequencies about the smallest and the largest principal axes of inertias of said block model, respectively, $b_1$ and $b_3$ are the damping coefficients about the smallest and the largest principal axes of inertia of said block model, respectively, $I_x, I_y, I_z$ are the moments of inertias of said block model about the principal axes X,Y,Z, respectively, and with $I_x<I_y<I_z$, wherein said frequencies cover a range given by $$\{0.1|\omega_{10}-\omega_{30}|, 2(\omega_{10}+\omega_{30})\},$$

demonstrating the first frequency case of said two dangerous frequencies by fixing said frequency at $|\omega_{10}-\omega_{30}|$ then changing said amplitude when said amplitude exceeds a threshold given by $$A_{P-TH} = \frac{1}{|\omega_{10}-\omega_{30}|} \sqrt{\frac{b_1 b_3}{(I_z-I_y)(I_y-I_x)}},$$

said rotating in oscillation about the intermediate principal of axis becoming unstable, demonstrating the second frequency case of said two dangerous frequencies by fixing said frequency at $(\omega_{10}+\omega_{30})$ then changing said amplitude when said amplitude exceeds a threshold given by $$A_{P-TH} = \frac{1}{\omega_{10}+\omega_{30}} \sqrt{\frac{b_1 b_3}{(I_z - I_y)(I_y - I_x)}},$$

said rotating in oscillation about the intermediate principal of axis becoming unstable.

\* \* \* \* \*

UNITED STATES PATENT AND TRADEMARK OFFICE
CERTIFICATE OF CORRECTION

PATENT NO. : 10,878,723 B2
APPLICATION NO. : 16/153883
DATED : December 29, 2020
INVENTOR(S) : Shaojie Tang It is certified that error appears in the above-identified patent and that said Letters Patent is hereby corrected as shown below:

In the Specification

BACKGROUND: Column 2, Line 6, "$\vec{\omega} = (p,q,r) = (\varphi, \dot{\theta}, \psi)$" to read as "$\vec{\omega} = (p,q,r) = (\dot{\varphi}, \dot{\theta}, \dot{\psi})$".

BACKGROUND: Column 2, Line 22, "$d\vec{H}/dt =$" to read as "$d\vec{H}/dt = \vec{M}$".

DETAILED DESCRIPTION: Column 13, Line 14, "$\omega_{21} \ll |\omega_{10} - \omega_{30})$" to read as "$\omega_{21} \ll |\omega_{10} - \omega_{30}|$".

In the Claims

Column 19, Line 20, "$\omega_{motor} = 30|\omega_{10} - \omega_{30}|\pi$" to read as "$\omega_{motor} = 30|\omega_{10} - \omega_{30}|/\pi$".

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*